United States Patent
Watanabe

(10) Patent No.: US 9,894,455 B2
(45) Date of Patent: Feb. 13, 2018

(54) CORRECTION OF SOUND SIGNAL BASED ON SHIFT OF LISTENING POINT

(71) Applicant: SONY CORPORATION, Tokyo (JP)

(72) Inventor: Tadatoshi Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 228 days.

(21) Appl. No.: 14/016,922

(22) Filed: Sep. 3, 2013

(65) Prior Publication Data

US 2014/0093108 A1 Apr. 3, 2014

(30) Foreign Application Priority Data

Oct. 2, 2012 (JP) .................................. 2012-219978

(51) Int. Cl.

| | |
|---|---|
| *H04R 5/02* | (2006.01) |
| *H04S 7/00* | (2006.01) |
| *G01S 3/808* | (2006.01) |
| *G01S 5/26* | (2006.01) |

(52) U.S. Cl.
CPC ............ *H04S 7/302* (2013.01); *G01S 3/8083* (2013.01); *G01S 5/26* (2013.01); *H04S 7/301* (2013.01)

(58) Field of Classification Search
None
See application file for complete search history.

(56) References Cited

U.S. PATENT DOCUMENTS

| | | | |
|---|---|---|---|
| 6,862,356 B1* | 3/2005 | Makino | 381/1 |
| 2002/0159611 A1* | 10/2002 | Cromer et al. | 381/303 |
| 2003/0031333 A1* | 2/2003 | Cohen et al. | 381/303 |
| 2004/0202332 A1* | 10/2004 | Murohashi et al. | 381/17 |
| 2007/0116306 A1* | 5/2007 | Riedel | H04S 7/303 381/303 |
| 2010/0323793 A1* | 12/2010 | Andall | A63F 13/10 463/35 |
| 2013/0016842 A1* | 1/2013 | Schultz-Amling et al. | 381/17 |
| 2013/0022204 A1* | 1/2013 | Adhikari et al. | 381/17 |

* cited by examiner

*Primary Examiner* — Joseph Saunders, Jr.
*Assistant Examiner* — James Mooney
(74) *Attorney, Agent, or Firm* — Chip Law Group

(57) ABSTRACT

A sound processing device includes a shift detection unit that detects a shift of a listening point on which a user listens to a sound in a sound field space from a standard reference listening point, and a correction unit that corrects a sound signal based on first sound field correction data for correcting a sound field when the listening point is the standard reference listening point and second sound field correction data for correcting a sound field of the listening point when the listening point is shifted from the standard reference listening point.

15 Claims, 17 Drawing Sheets

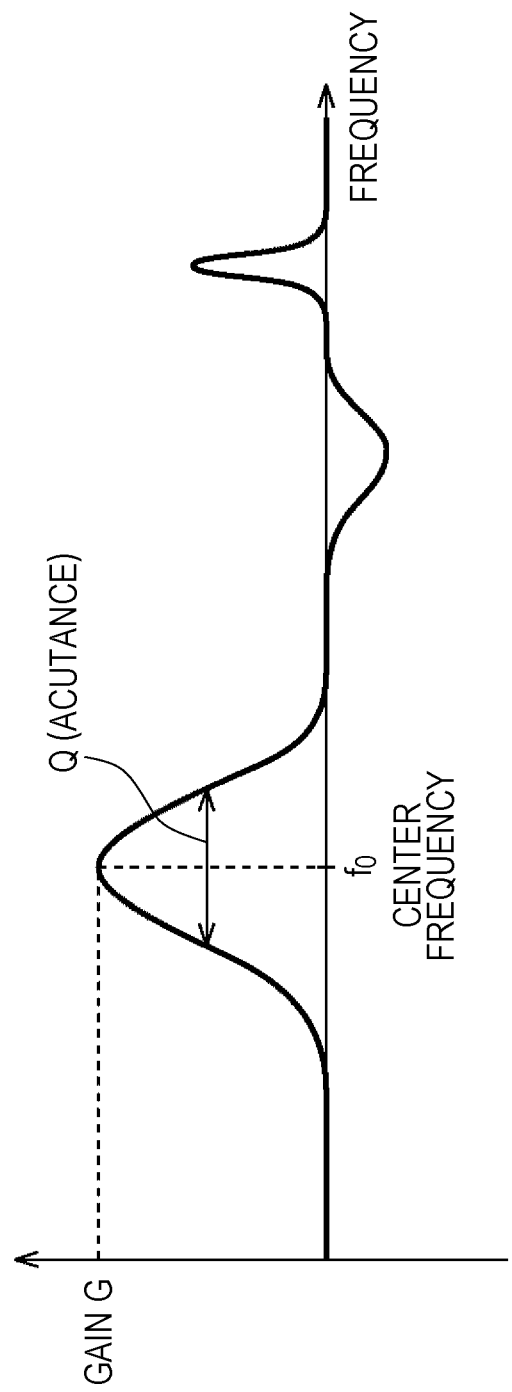

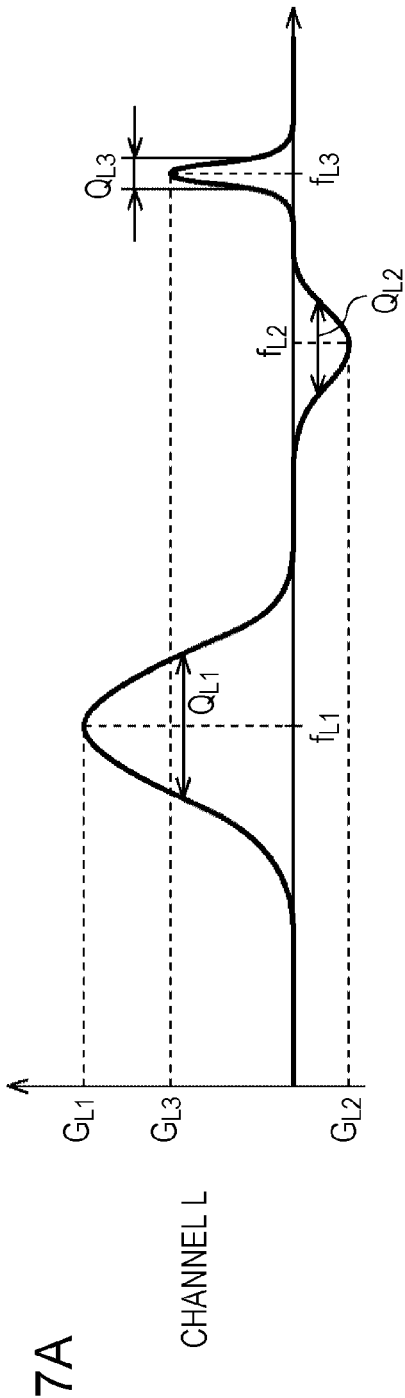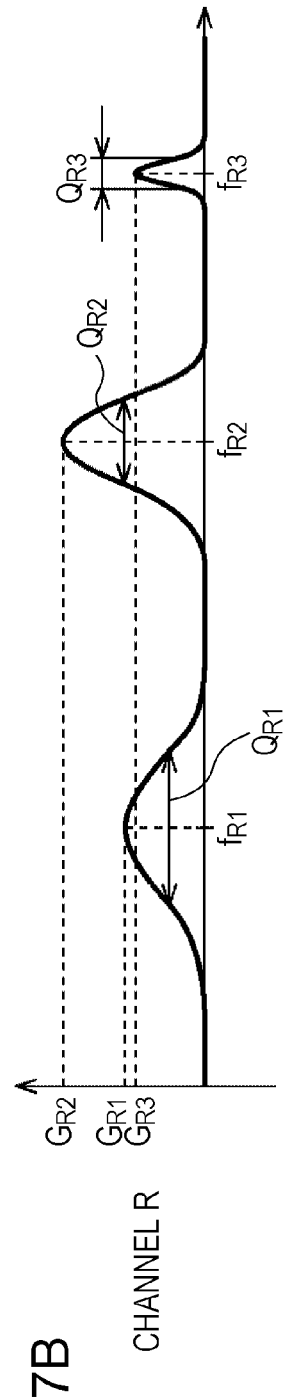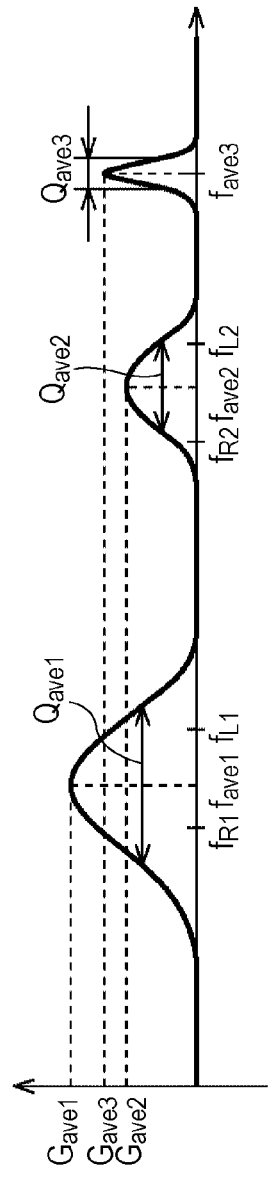
FIG. 7A CHANNEL L
FIG. 7B CHANNEL R
FIG. 7C AVERAGE VALUE OF CHANNELS L AND R

CORRECTION OF SOUND SIGNAL BASED ON SHIFT OF LISTENING POINT

BACKGROUND

The present technology relates to a sound processing device and a method thereof, a program, and a recording medium, and particularly to a sound processing device and method, a program, and a recording medium that enable simple field correction at an arbitrary position of a sound field space.

In a multi-channel audio system, from peripheral speakers disposed in different positions, sounds of different channels corresponding to the positions are emitted, and thus, a listener can enjoy music enriched with the same sense of presence as if the listener is in a theater or at a music hall.

In general, an ideal listening position is the center position in the disposition of speakers, and if a listening position is shifted from the center, the listener is not able to enjoy music in high sound quality.

Thus, correcting a sound field according to the position of a listener has been proposed (for example, refer to Japanese Unexamined Patent Application Publication No. 2006-287606). In the technology disclosed in Japanese Unexamined Patent Application Publication No. 2006-287606, an infrared light emitting unit is installed in a microphone, and infrared light sensing units are installed in respective speakers. An infrared light beam emitted from the infrared light emitting unit of the microphone disposed in a position of a listener is sensed by the infrared light sensing units installed in the speakers. The distance between each speaker and the microphone is computed from a level of sensing the infrared light, and the position of the microphone, i.e., the position of the listener is computed based on the distance. Further, a sound field is corrected based on the position.

SUMMARY

However, in the case of the technology disclosed in Japanese Unexamined Patent Application Publication No. 2006-287606, when a listening position is changed, it is necessary to accordingly measure the characteristics of a sound field thoroughly again, and the correction of the sound field takes time, which are inconvenient for a user.

It is desirable to enable simple correction of a sound field at an arbitrary position in a sound field space. According to an embodiment of the present technology, there is provided a sound processing device which includes a shift detection unit that detects a shift of a listening point on which a user listens to a sound in a sound field space from a standard reference listening point, and a correction unit that corrects a sound signal based on first sound field correction data for correcting a sound field when the listening point is the standard reference listening point and second sound field correction data for correcting a sound field of the listening point when the listening point is shifted from the standard reference listening point.

According to the embodiment, the second sound field correction data may be data of a peripheral reference listening point in a position shifted from the standard reference listening point.

According to the embodiment, when the position of the listening point is different from the position of the peripheral reference listening point, the second sound field correction data on the nearest peripheral reference listening point may be the second sound field correction data of the listening point.

According to the embodiment, the shift of the listening point from the standard reference listening point may be detected by collecting a measurement sound generated from the listening point.

According to the embodiment, the shift of the listening point from the standard reference listening point may be detected from the position of the listening point with respect to a position in which the measurement sound generated from the listening point is collected and a position in which the measurement sound is collected with respect to the standard reference listening point.

According to the embodiment, the position of the listening point with respect to the position in which the measurement sound generated from the listening point is collected may be detected from a sound signal obtained by collecting the measurement sound generated from the listening point.

According to the embodiment, the position in which the measurement sound is collected with respect to the standard reference listening point may be detected from position information of a sound emitting unit that emits a sound that the user listens to on the listening point in the sound field space with respect to the position in which the measurement sound is collected and position information of the sound emitting unit with respect to the standard reference listening point.

According to the embodiment, a measurement unit that obtains the first sound field correction data by measuring a sound field of the sound field space may be further included.

According to the embodiment, a storage unit that stores the second sound field correction data in advance may be further included.

According to the embodiment, the storage unit may further store the first sound field correction data measured by the measurement unit.

According to the embodiment, a parameter calculated from the first sound field correction data and the second sound field correction data may be set in the correction unit.

According to the embodiment, the first sound field correction data and the second sound field correction data may be set as individual parameters in different correction units.

According to another embodiment of the present technology, there is provided a sound processing method that includes steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

According to still another embodiment of the present technology, there is provided a program that causes a computer to execute processes including steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

According to still another embodiment of the present technology, there is provided a recording medium on which is recorded a program that causes a computer to execute processes including steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

According to the embodiments of the present technology, a shift of a listening point on which a user listens to a sound in a sound field space from a standard reference listening point is detected and a sound signal is corrected based on first sound field correction data for correcting a sound field when the listening point is the standard reference listening point and second sound field correction data for correcting a sound field of the listening point when the listening point is shifted from the standard reference listening point.

As described above, according to the embodiments of the present technology, a sound field can be simply corrected at an arbitrary position in a sound field space.

BRIEF DESCRIPTION OF THE DRAWINGS

FIG. 6 is a diagram illustrating an example of a frequency characteristic of equalizer devices;

FIGS. 7A to 7C are graphs describing examples of an averaging process;

DETAILED DESCRIPTION OF EMBODIMENTS

Hereinafter, embodiments for implementing the present technology (hereinafter, referred to as embodiments) will be described. Note that description will be provided in the following order:
1. Configuration of Sound Processing System 1
2. Functional configuration of CPU 21
3. Functional configuration of DSP 22
4. Sound field correction data map
5. Sound field correction process
6. Position detection process
7. Modification example
8. Application of the present technology to a program
9. Other configurations Configuration of Sound Processing System 1

Figure 1:
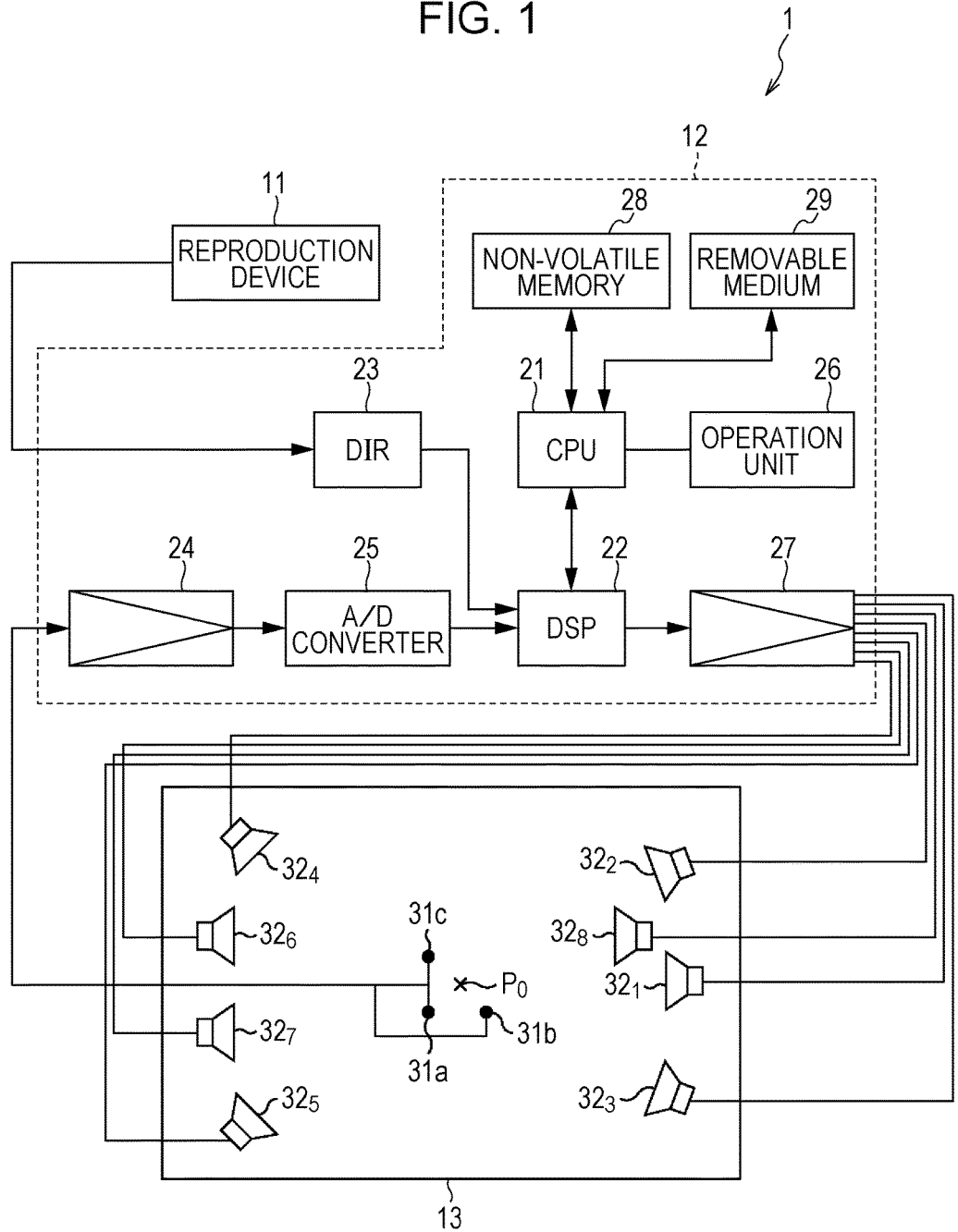
FIG. 1 is a block diagram illustrating a configuration of an embodiment of a sound processing system according to the present technology.

FIG. 1 is a block diagram illustrating a configuration of a sound processing system 1 according to an embodiment of the present technology. This sound processing system 1 includes a reproduction device 11, a sound processing device 12, and a sound field space 13 as shown in FIG. 1.

The reproduction device 11 reproduces recorded information from a recording medium, for example, an optical disc such as a Blu-ray Disc (BD) (registered trademark), a High Definition Digital Versatile Disc (HD-DVD), a hard disk, or a semiconductor memory. In addition, the reproduction device 11 reproduces received information using a built-in tuner. The sound field space 13 is a space in which a user listens to a sound such as music as a reproduced sound. In the present embodiment, there are three microphones $31a$, $31b$, and $31c$, and eight speakers $32_1$ to $32_8$ disposed in the sound field space 13. Note that, when it is not necessary to separately distinguish the microphones or the speakers hereinbelow, they are simply referred to as the microphones 31 or the speakers 32.

The sound processing device 12 includes a CPU (Central Processing Unit) 21, a DSP (Digital Signal Processor) 22, a DIR (Digital Interface Receiver) 23, an amplifier 24, an A/D (Analog to Digital) converter 25, an operation unit 26, an amplifier 27, a non-volatile memory 28, and a removable medium 29.

The speakers 32 are disposed in predetermined positions in the sound field space 13. In the case of a 7.1 channel speaker system, for example, a front-left speaker $32_2$ is disposed on the left side, a front-right speaker $32_3$ is disposed on the right side, and a center speaker $32_1$ is disposed at the center in front of a standard reference listening point $P_0$. In addition, a surround-left speaker $32_4$ is disposed on the left side and a surround-right speaker $32_5$ is disposed on the right side on the back side of the listening position, and a surround-back left speaker $32_6$ is disposed on the left side and a surround-back right speaker $32_7$ is disposed on the right side between them. Further, a sub-woofer speaker $32_8$ dedicated to reproduction of a low frequency sound is disposed in an arbitrary position (in the present embodiment, on the left side of the center on the front side).

In the sound processing system 1, the user measures a sound field characteristic of the sound field space 13 in advance when the user listens to music, or the like in the sound field space 13. This measurement is performed basically once, but when a listening environment is changed due to a change in the disposition of the speakers 32, the measurement is performed according to the change.

When the sound field characteristic of the sound field space 13 is measured, a measurement signal for measuring the sound field characteristic is supplied to the plurality of speakers 32 disposed in the predetermined positions in the sound field space 13. This measurement signal can be set to be, for example, an impulse signal. Then, a sound output from the speakers 32 is collected by the plurality of microphones 31. Then, based on measured data computed from the sound collecting signal obtained as above, an acoustic characteristic and a frequency characteristic of the plurality of speakers 32 are corrected, and a virtual sound image localization process is performed. In other words, a sound field correction process is performed.

When the sound field characteristic of the sound field space 13 is measured, the microphones 31 are disposed in the standard reference listening point $P_0$ being separate from each other by a predetermined distance. The standard reference listening point $P_0$ is a standard point among arbitrary listening points at which a user actually listens to a heard sound such as music. To be specific, the three microphones 31 are disposed in, for example, an L shape. In other words, the microphones are disposed so that the line connecting the microphone 31a and the microphone 31b and the line connecting the microphone 31a and the microphone 31c form substantially a right angle, in other words, the three microphones 31a to 31c are positioned at the vertexes of a right-angle isosceles triangle. In addition, the three microphones 31a to 31c are disposed so that the standard reference listening point $P_0$ is positioned at the center of the bottom side of the right-angle isosceles triangle. Of course, the disposition of the microphones 31 is not limited thereto, and any disposition is possible as long as the standard reference listening point $P_0$ can be specified from positions in which the microphones 31 are disposed.

The operation unit 26 is a user interface (UI) with which a user operates the CPU 21, and is input with instructions of, for example, a sound field characteristic measurement mode, a position detection mode, a reproduction mode, and the like.

The CPU 21 controls each unit having a random access memory (RAM), which is not shown, as a work memory according to a program stored in a read-only memory (ROM) or the removable medium 29, which is not shown, in advance. When the position detection mode is instructed from the operation unit 26, for example, the CPU 21 controls the DSP 22 to output a measurement signal for detecting a position and to output a measurement signal from the amplifier 27. In addition, the CPU 21 causes the non-volatile memory 28 to store measurement data computed from the DSP 22 based on a measurement sound collected by the microphones 31, and controls the DSP 22 based on the above measurement data during reproduction of a sound signal of a heard sound. The amplifier 27 amplifies a measurement signal supplied from the DSP 22 and a sound signal of a heard sound processed in the DSP 22, and supplies the signals to the speakers 32.

The microphones 31 collect measurement sound output from the speakers 32 to which the measurement signal is supplied, convert the collected measurement sound into a sound collecting signal, and supply the signal to the amplifier 24. The amplifier 24 amplifies the sound collecting signal from each of the microphones 31, and supplies the result to the A/D converter 25. The A/D converter 25 converts the sound collecting signal from each of the microphones 31 that has been amplified in the amplifier 24 into a digital signal, and supplies the signal to the DSP 22.

When a sound signal from the reproduction device 11 is reproduced, the CPU 21 performs a sound field correction process. In other words, the non-volatile memory 28 stores sound field correction data, and the CPU 21 reads the sound field correction data from the non-volatile memory 28 and sets the data in the DSP 22. Accordingly, the sound field correction process is performed on the sound signal supplied from the reproduction device 11 via the DIR 23, and the processed sound signal is amplified by the amplifier 27, and output from the speakers 32.

Note that the non-volatile memory 28 stores two kinds of sound field correction data. First sound field correction data is sound field correction data obtained as a result of measuring the sound field space 13 in the sound field characteristic measurement mode. Second sound field correction data is data for position adjustment. When an actual listening point of a user is changed to another point from the standard reference listening point $P_0$, the sound field correction data for position adjustment is data for enabling the same sound field characteristic as in the standard reference listening point $P_0$ to be realized. The sound field correction data for position adjustment is prepared in advance by the manufacturer of the sound processing device 12, and stored in the non-volatile memory 28 as a sound field correction data map 101 (to be described later with reference to FIG. 4).

Functional Configuration of the CPU 21

Figure 2:
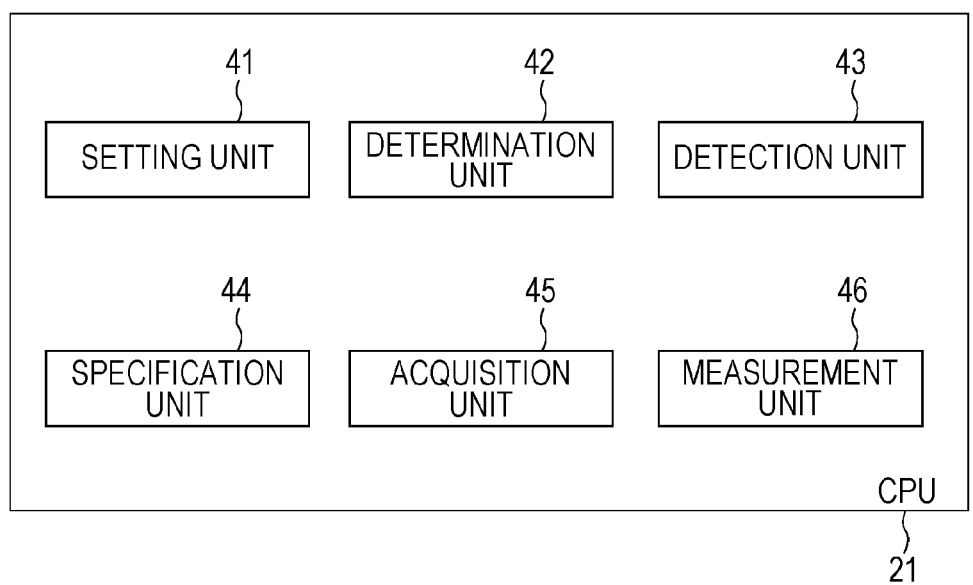
FIG. 2 is a block diagram illustrating a functional configuration of a CPU that performs a sound field correction process.

FIG. 2 is a block diagram illustrating a functional configuration of the CPU 21 that performs a sound field correction process. As illustrated in the drawing, the CPU 21 has functional blocks of a setting unit 41, a determination unit 42, a detection unit 43, a specification unit 44, an acquisition unit 45, and a measurement unit 46.

The setting unit 41 sets the sound field correction data. The determination unit 42 performs a determination process. The detection unit 43 detects a position. The specification unit 44 performs a process of specifying a position. The acquisition unit 45 acquires data. The measurement unit 46 executes a sound field characteristic measurement process of the sound field space 13.

Functional Configuration of the DSP 22

Figure 3:
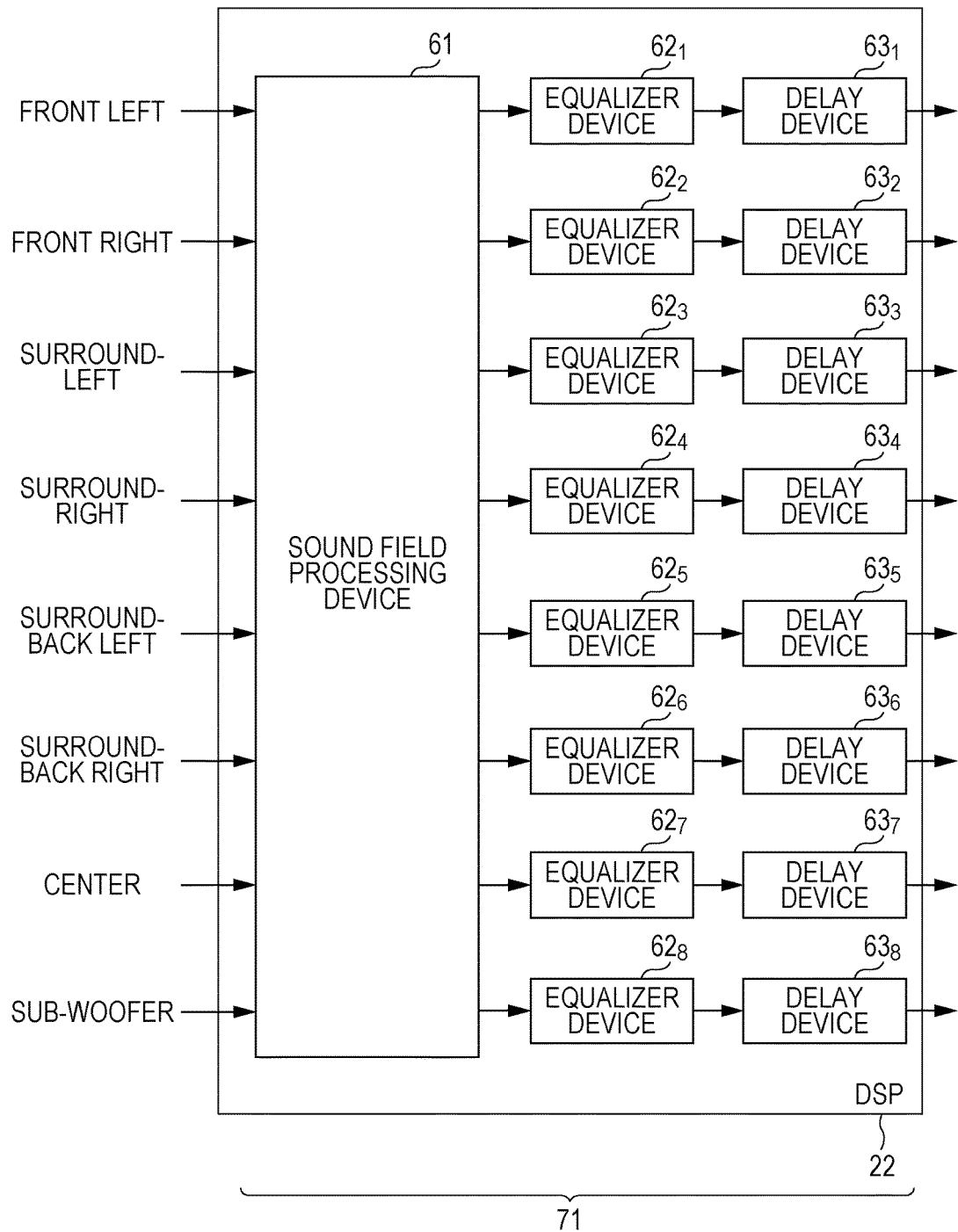
FIG. 3 is a block diagram illustrating a functional configuration of a DSP that performs a sound field correction process.

FIG. 3 is a block diagram illustrating a functional configuration of the DSP 22 that performs a sound field correction process. The DSP 22 has a correction unit 71. The correction unit 71 includes a sound field processing device 61, equalizer devices $62_1$ to $62_8$, and delay devices $63_1$ to $63_8$. When it is not necessary to distinguish the individual equalizer devices $62_1$ to $62_8$ and delay devices $63_1$ to $63_8$, they are referred to simply as the equalizer devices 62 and the delay devices 63.

The sound field processing device 61 performs sound field processing such as reverberation addition onto a sound signal of each channel supplied from the DIR 23, and supplies the result to the equalizer devices 62 of corresponding channels. The sound field processing is a process of generating an invisible virtual speaker 121 (to be described later with reference to FIG. 9), and reproducing a space reverberation characteristic of a predetermined studio or a theater, or the like. The equalizer devices 62 are so-called parametric equalizers, correcting a frequency characteristic of a sound signal of each channel supplied from the sound field processing device 61 based on a center frequency $f_0$, a gain G, and an acutance Q which are parameters given from the CPU 21. The corrected sound signal is supplied to the delay devices 63 of corresponding channels.

Note that, as in the embodiment of FIG. 3, providing one correction unit 71 can simplify the configuration more than providing two correction units 71 as in the embodiment of FIG. 18 to be described later.

Sound Field Correction Data Map

A sound field correction data map provided by a manufacturer is stored in advance in the non-volatile memory 28.

Figure 4:
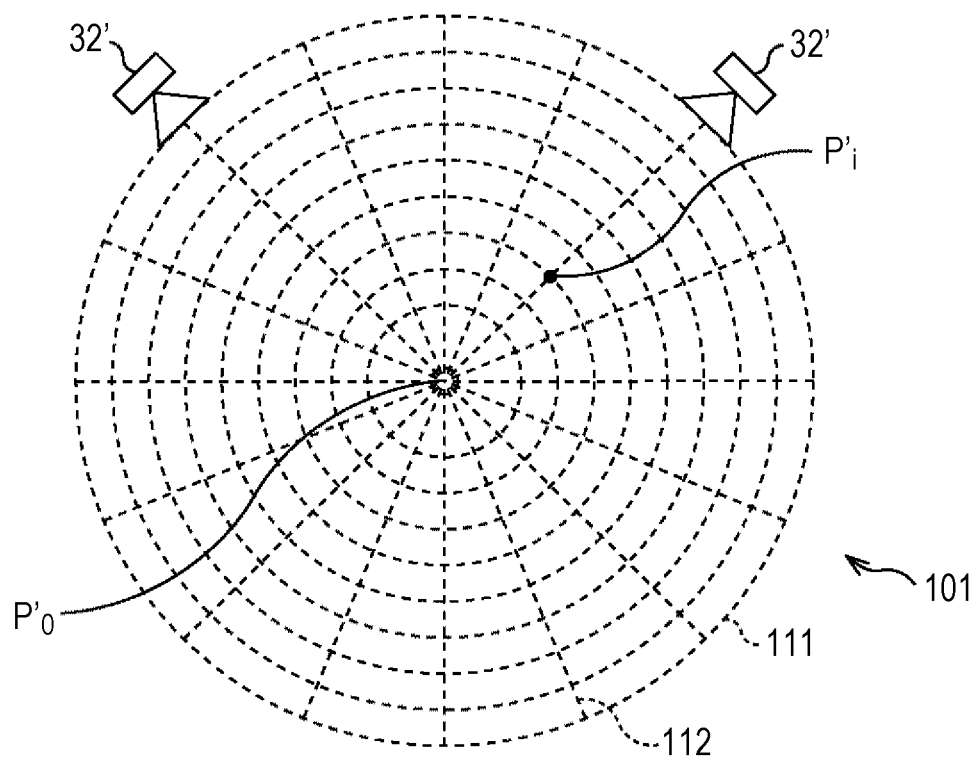
FIG. 4 is a diagram describing a sound field correction data map.

FIG. 4 is a diagram describing a sound field correction data map. Note that reference numerals of units in the sound field correction data map 101 are indicated with the addition of an apostrophe (') to corresponding reference numerals of units in the sound field space 13.

As illustrated in FIG. 4, the sound field correction data map 101 is a map of sound field correction data of a reference listening point $P'_j$ in a listening space under an ideal environment in which a plurality of speakers 32' are disposed. The reference listening points $P'_j$ (j=0, 1, 2, . . . , n) are composed of a standard reference listening point $P'_0$ and peripheral reference listening points $P'_i$ (i=1, 2, . . . , n). The standard reference listening point $P'_0$ is a point of a standard position for listening to music, or the like in the listening space under the ideal environment.

Based on the standard reference listening point $P'_0$ serving as the center, a plurality of lines 111 in a concentric circular shape disposed at predetermined intervals and a plurality of lines 112 in a radial shape are imagined. In addition, reference listening points $P'_j$ positioned on the intersection of the plurality of lines 111 and lines 112 are peripheral reference listening points $P'_i$. In other words, the plurality of peripheral reference listening points $P'_i$ are present in the peripheries shifted from the standard reference listening point $P'_0$.

The sound field correction data (in other words, the second sound field correction data) of the sound field correction data map 101 is data necessary for forming the same sound field as the standard reference listening point $P'_0$ when a listening point is shifted from the standard reference listening point $P'_0$. For example, it is assumed that a parameter necessary for generating a sound field that can realize a sufficient sense of presence at the standard reference listening point $P'_0$ intended in designing (hereinafter, referred to as a target sound field) is $PR'_0$. In other words, if the parameter $PR'_0$ is set in the correction unit 71, the virtual speaker 121 (to be described later with reference to FIG. 9) is generated in a predetermined position, and a sound is output from the speaker, realizing the target sound field. In the same manner, it is assumed that a parameter necessary for generating a target sound field at a peripheral reference listening point $P'_i$ is $PR'_i$. In this case, sound field correction data (in other words, second sound field correction data) $D'_i$ of the peripheral reference listening point $P'_i$ on the sound field correction data map 101 is computed from the following formula:

$$D'_i = PR'_i - PR'_0 \quad (1)$$

In other words, the sound field correction data $D'_i$ is a parameter of the difference between the parameter $PR'_i$ and the parameter $PR'_0$. If the sound field correction data $D'_i$ of the formula (1) is expressed when including a case of the standard reference listening point $P'_0$, the sound field correction data $D'_0$ on the sound field correction data map 101 at the standard reference listening point $P'_0$ becomes 0 as in the formula (2):

$$D'_j = PR'_j - PR'_0 \quad (2)$$

Next, with reference to FIG. 5, a process of creating a sound field correction data map performed by a manufacturer will be described exemplifying sound field correction on a phase. Herein, a case in which sound field correction data of sound signals of front-right and -left channels at the standard reference listening point $P'_0$ will be described for the sake of simplicity. Note that, although not shown in the drawing, the manufacturer has a sound processing system 1' the same as the sound processing system 1 illustrated in FIG. 1 in order to create the sound field correction data map.

Hereinbelow, reference numerals obtained by adding apostrophes (') to the reference numerals of the units of the sound processing system 1 of FIG. 1 are used as corresponding reference numerals of units of the sound processing system 1'.

Figure 5:
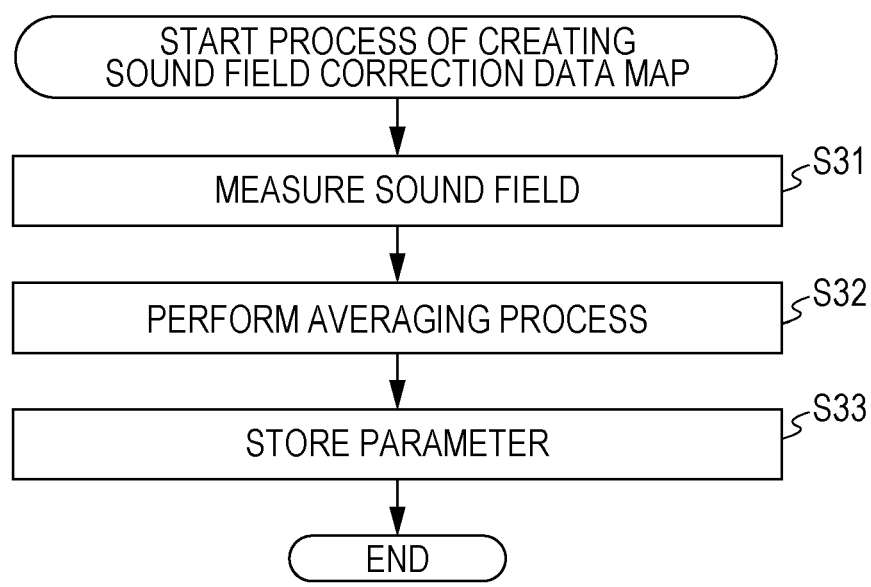
FIG. 5 is a flowchart describing a process of creating a sound field correction data map.

FIG. 5 is a flowchart describing the process of creating a sound field correction data map. In Step S31, a process of measuring a sound field is performed. In other words, a sound emitted from a pair of right and left speakers 32' disposed in predetermined positions is collected by a microphone 31' disposed on the standard reference listening point $P'_0$. Using the sound collecting signal, measurement data such as a frequency characteristic, and position information of the pair of right and left speakers 32' is obtained for right and left channels.

In Step S32, an averaging process is performed. In other words, parameters for frequency characteristic correction of the right and left channels included in the measurement data are rearranged in order from lower center frequencies for the right and left channels. Then, average values of the parameters for pairs of the right and left channels are computed in order from lower center frequencies.

The averaging process will be described below exemplifying a frequency characteristic of equalizer devices 62' that perform sound field correction.

FIG. 6 illustrates an example of the frequency characteristic of the equalizer devices 62'. Note that, in FIG. 6, the horizontal axis that is a frequency axis is a logarithmic axis. The frequency characteristic is set with parameters of a center frequency $f_0$, a gain G, and an acutance Q. The equalizer devices 62' corresponding to channels are configured to correct the frequency characteristic for each band within the corresponding channel. When an audio frequency band of each channel is divided into six bands, for example, parameters are set in each of the equalizer devices 62' for the six bands, and the frequency characteristic for sound signals is corrected.

Delay devices 63' cause delay times of the sound signals of each channel supplied from the equalizer devices 62' to change, and correct, for example, the distances between the speakers 32' and the standard reference listening point $P'_0$.

FIGS. 7A to 7C are graphs describing examples of the averaging process. Note that, in FIGS. 7A to 7C, the horizontal axis that is a frequency axis is indicated by a logarithmic axis.

As illustrated in FIGS. 7A and 7B, parameters are computed for front-right and -left channels. In other words, center frequencies $f_{L1}, f_{L2}, f_{L3}, \ldots$, center frequencies $f_{R1}, f_{R2}, f_{R3}, \ldots$, Gains $G_{L1}, G_{L2}, G_{L3}, \ldots$, Gains $G_{R1}, G_{R2}, G_{R3}, \ldots$, acutances $Q_{L1}, Q_{L2}, Q_{L3}, \ldots$, and acutances $Q_{R1}, Q_{R2}, Q_{R3}, \ldots$ are computed.

The computed parameters are rearranged in order from lower center frequencies for each front-right and -left channel. Then, as illustrated in FIG. 7C, average values of the parameters are computed for pairs of the right and left channels in order from lower center frequencies.

AVERAGE VALUES OF CENTER FREQUENCIES $$f_{ave1} = 10^{(\log f_{L1} + \log f_{R1})/2}$$

$$f_{ave2} = 10^{(\log f_{L2} + \log f_{R2})/2}$$

$$f_{ave3} = 10^{(\log f_{L3} + \log f_{R3})/2}$$

$$\vdots$$

-continued

AVERAGE VALE OF GAINS $G_{ave1} = (G_{L1} + G_{R1})/2$ $G_{ave2} = (G_{L2} + G_{R2})/2$ $G_{ave3} = (G_{L3} + G_{R3})/2$

⋮

ACUTANCE $Q_{ave1} = (Q_{L1} + Q_{R1})/2$ $Q_{ave2} = (Q_{L2} + Q_{R2})/2$ $Q_{ave3} = (Q_{L3} + Q_{R3})/2$

⋮

After the averaging process is performed as described above, in Step S33, a process of storing the parameters in a non-volatile memory 28' is performed. In other words, the parameters of the equalizer devices 62' and the delay devices 63' of the front-left channel, and the parameters of the equalizer devices 62' and the delay devices 63' of the front-right channel that have undergone the averaging process in Step S32 are stored in the non-volatile memory 28'. The parameters correct frequency characteristics of the sound signals of the front-right and -left channels to be the same.

The same process is executed on other all speakers 32'. Accordingly, sound field correction data as a parameter $PR_0$ necessary for realizing the target sound field on the standard reference listening point $P'_0$ is acquired, and associated with position information.

After a sound field characteristic measurement process is performed on the standard reference listening point $P'_0$, the microphone 31' is moved to another peripheral reference listening point $P'_j$, and a sound field characteristic measurement process is executed there. Then, a parameter $PR_j$ necessary for realizing the target sound field on the peripheral reference listening point $P'_j$ is computed. Further, based on the above formula (2), sound field correction data $D'_j$ as a parameter of the difference between a parameter $PR'_j$ and a parameter $PR'_0$ is computed.

In this manner, the sound field correction data on all of the reference listening points $P'_j$ is acquired, and stored in the non-volatile memory 28' as the sound field correction data map 101 with the position information. Note that the position information of the speakers 32' is also stored in the non-volatile memory 28' as a part of the sound field correction data map 101. Coordinates of the speakers 32' are coordinates with reference to the standard reference listening point $P'_0$.

Hereinabove, an example of sound field correction with regard to the phase of the speakers 32' has been described, however, sound field correction data such as an equalizer, a gain, or delay in addition to phase is also acquired. In other words, entire sound field correction data necessary for realizing a target sound field is acquired on each peripheral reference listening point $P'_j$ in the same manner as on the standard reference listening point $P'_0$, and is stored in the non-volatile memory 28' as the sound field correction data map 101. The sound field correction data map 101 stored in the non-volatile memory 28' is stored in the non-volatile memory 28. Alternatively, the non-volatile memory 28' is used as the non-volatile memory 28.

Sound Field Correction Process

Figure 8:
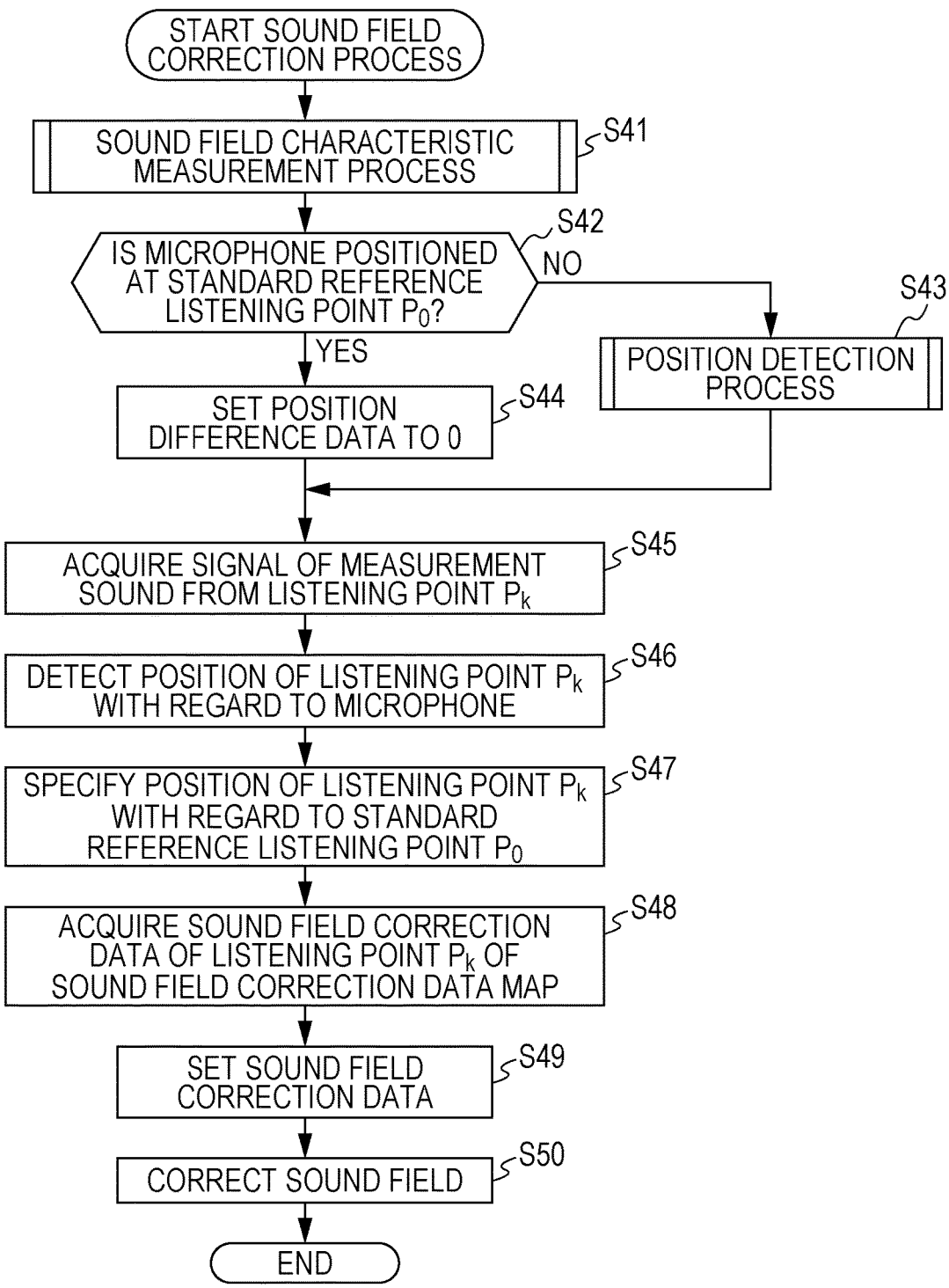
FIG. 8 is a flowchart describing an operation of a sound field correction process.

Next, with reference to the flowchart of FIG. 8, the sound field correction process by the sound processing system 1 will be described. FIG. 8 is a flowchart describing an operation of the sound field correction process.

In Step S41, the sound field characteristic measurement mode is set, and the measurement unit 46 executes a sound field characteristic measurement process in the sound field space 13. The sound field characteristic measurement process is performed only on the standard reference listening point $P_0$ that is a standard point on which a user listens to music, or the like in the sound field space 13. In other words, a microphone 31 is disposed on the standard reference listening point $P_0$, a measurement signal for sound field characteristic measurement is supplied to the speakers 32, and sound field correction data necessary for realizing an ideal sound field on the standard reference listening point $P_0$ is acquired. The sound field correction data is stored in the non-volatile memory 28. The sound field characteristic measurement process on the standard reference listening point $P_0$ in the sound field space 13 is the same as the sound field characteristic measurement process on the standard reference listening point $P'_0$ in the process of creating the sound field correction data map, and repetitive detailed description will be omitted.

The sound field characteristic measurement process in the sound field space 13 is performed only once for the first time after the plurality of speakers 32 are disposed in predetermined positions in the sound field space 13, however when the environment is changed such as the positions of the speakers 32 being changed, the process is performed again.

The determination unit 42 determines whether or not the microphone 31 is positioned on the standard reference listening point $P_0$ in the sound field space 13 in Step S42. In other words, the user disposes the microphone 31 in arbitrary positions in the sound field space 13. The microphone 31 can be disposed in positions not interfering with the user listening to music, or the like. Then, the user inputs that the position in which the microphone 31 is disposed is the standard reference listening point $P_0$ with an operation of the operation unit 26. The determination unit 42 performs the determination process of Step S42 based on the input from the user.

When the microphone 31 is determined not to be positioned on the standard reference listening point $P_0$ in Step S42, in other words, when the microphones 31 are positioned in positions other than the standard reference listening point $P_0$, a position detection mode is set in Step S43, and a position detection process is executed. Though details of the position detection process will be described later with reference to FIG. 11, the position of the microphone 31 with respect to the standard reference listening point $P_0$ which is disposed at that time is detected from the process.

Figure 9:
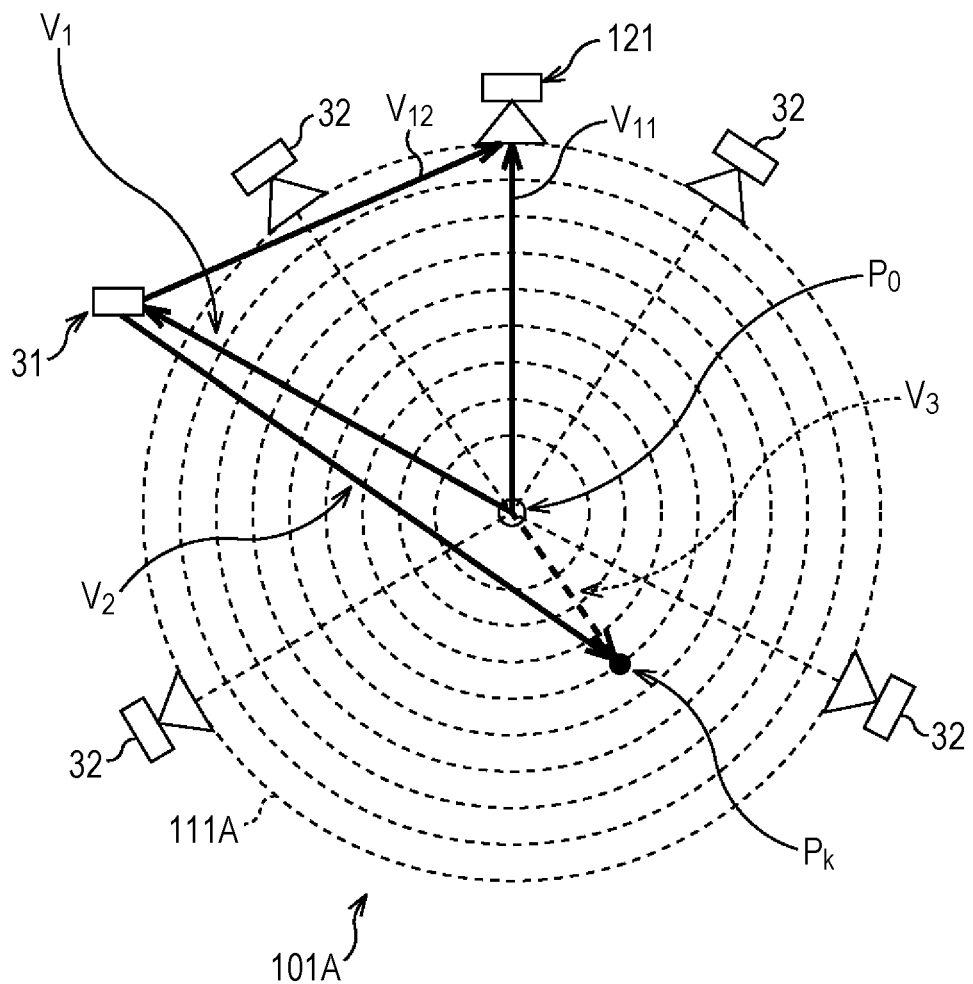
FIG. 9 is a diagram describing positions in a sound field space.

FIG. 9 is a diagram describing positions in the sound field space 13. A space 101A in the sound field space 13 can be considered to correspond to the sound field correction data map 101. The microphone 31 in FIG. 9 is disposed in a position (in the vicinity of a line 111A on the outermost side of the drawing) different from the position of the standard reference listening point $P_0$. From the position detection process of Step S43, position difference data $V_1$ denoting a vector facing the microphone 31 from the standard reference listening point $P_0$ in FIG. 9 is obtained. The position difference data $V_1$ is position information indicating the position of the microphone 31 with respect to the standard reference listening point $P_0$.

On the other hand, when the microphone 31 is determined to be positioned on the standard reference listening point $P_0$ in Step S42, the setting unit 41 sets the position difference data $V_1$ to be 0 in Step S44.

After the processes of Step S43 and Step S44, the acquisition unit 45 acquires a signal of a measurement sound from a listening point $P_k$ in Step S45. In other words, the user moves to the listening point $P_k$ that is the position in which the user wants to listen to music, or the like. Then, the user generates measurement sounds by, for example, clapping hands or raising a voice. The generated measurement sounds are collected by the microphone 31. Sound signals of the collected measurement sounds are amplified by the amplifier 24, A/D-converted by the A/D converter 25, and acquired by the acquisition unit 45 of the CPU 21 via the DSP 22.

The detection unit 43 detects the position of the listening point $P_k$ with respect to the microphone 31 in Step S46. In other words, with the sound signals collected in the process of Step S45, the position of the listening point $P_k$ from the microphone 31 that collects the measurement sounds can be detected. This process is the same as the position detection process (process of FIG. 11 to be described later) of Step S43. In other words, the detection unit 43 corresponds to a sound collecting signal acquisition unit 81, a phase difference calculation unit 82, a stencil filtering process unit 83, a sound source direction estimation unit 84, and a position detection unit 85 of FIG. 10 to be described later. In this manner, position data $V_2$ that is a vector toward the listening position $P_k$ from the microphone 31 of FIG. 9 is obtained. The position data $V_2$ is position information indicating the position of the listening position $P_k$ with respect to the microphone 31.

The specification unit 44 specifies the position of the listening position $P_k$ with respect to the standard reference listening point $P_0$ in Step S47. In other words, as shown in FIG. 9, the position difference data $V_1$ obtained in Step S43 or Step S44 and the position data $V_2$ obtained in Step S46 are combined. Accordingly, position data $V_3$ that is a vector as position information indicating the position of listening position $P_k$ with respect to the standard reference listening point $P_0$ is obtained.

The acquisition unit 45 acquires sound field correction data of the listening position $P_k$ on the sound field correction data map 101 in Step S48. As described above, the non-volatile memory 28 stores the sound field correction data map 101, and on the sound field correction data map 101, the sound field correction data of the standard reference listening point $P_0$ and the peripheral reference listening point $P_i$ is associated with the position data. The acquisition unit 45 acquires sound field correction data of the reference listening point $P_j$ corresponding to the listening position $P_k$ specified in the process of Step S47 from the sound field correction data map 101. When the position of the listening position $P_k$ specified in the process of Step S47 is different from the position of the standard reference listening point $P_0$ or the reference listening point $P_j$, sound field correction data of the nearest reference listening point $P_j$ is acquired as the sound field correction data of the listening position $P_k$.

Accordingly, data for performing sound field correction can be simply and quickly obtained not only on the standard reference listening point $P_0$ in the sound field space 13 but also on an arbitrary listening position $P_k$. In addition, it is not necessary to dispose the microphone 31 on the listening position $P_k$, the microphone 31 can be disposed in an arbitrary position in the sound field space 13, and work on sound field correction becomes simple, without necessitating rearrangement of the microphone 31.

In Step S49, the setting unit 41 sets the sound field correction data acquired in Step S48. In other words, the sound field correction data is set as a parameter of the correction unit 71 of the DSP 22 (to be specific, the sound field processing device 61, the equalizer devices 62, and the delay devices 63) that processes the sound signals of each channel. In this case, the setting unit 41 calculates the parameter as the sound field correction data to be set based on the following formula (3). The formula (3) is a formula elicited when the above-described formula (2) is applied to the sound field space 13 in an ideal environment.

$$PR_j = PR_0 + D'_j \quad (3)$$

In other words, the condition of a sound field made from a shift between the standard reference listening point $P'_0$ and the reference listening points $P'_j$ in an ideal environment is considered to be the same as (or similar to) the condition of a sound field made from a shift between the standard reference listening point $P_0$ and the reference listening points $P_j$ in the sound field space 13. Thus, instead of the parameter $PR'_0$ of the standard reference listening point $P'_0$ in the ideal environment of the formula (2), the parameter $PR_0$ of the standard reference listening point $P_0$ in the sound field space 13 is applied. Then, by modifying the formula (2), a formula for obtaining the parameter $PR_j$ of the reference listening points $P_j$ in the sound field space 13 corresponding to the parameter $PR'_j$ of the reference listening points $P'_j$ in the ideal environment is obtained. Thus, the parameter $PR_0$ (in other words, first sound field correction data) stored in the non-volatile memory 28 in the process of Step S41 is read, and sound field correction data $D'_j$ that is second sound field correction data is read from the non-volatile memory 28 in the process of Step S48. Then, by applying the data to the formula (3), the parameter $PR_j$ on the listening point $P_k$ can be obtained.

The DSP 22 corrects the sound field in Step S50. In other words, the sound field correction data $PR_j$ calculated based on the formula (3) as described above is set in the correction unit 71 (the sound field processing device 61, the equalizer devices 62, and the delay devices 63) as a parameter. Accordingly, a target sound field that is substantially the same as (in other words, similar to) an ideal sound field space provided by the manufacturer is formed on the listening point $P_k$ in the sound field space 13. As a result, after the formation, a reproduction mode is set, reproduction is instructed to the reproduction device 11, and the sound signals reproduced from the device and input via the DIR 23 are appropriately corrected by the correction unit 71 of the DSP 22, and then output from the speakers 32 via the amplifier 27. Thus, the user can listen to high-quality sound information on the reference listening point $P_j$ in the sound field space 13 and a near arbitrary listening point $P_k$ as well.

Position Detection Process

Next, details of the position detection process of Step S43 of FIG. 8 will be described. In order to perform this process, the CPU 21 further includes the configuration of FIG. 10.

Figure 10:
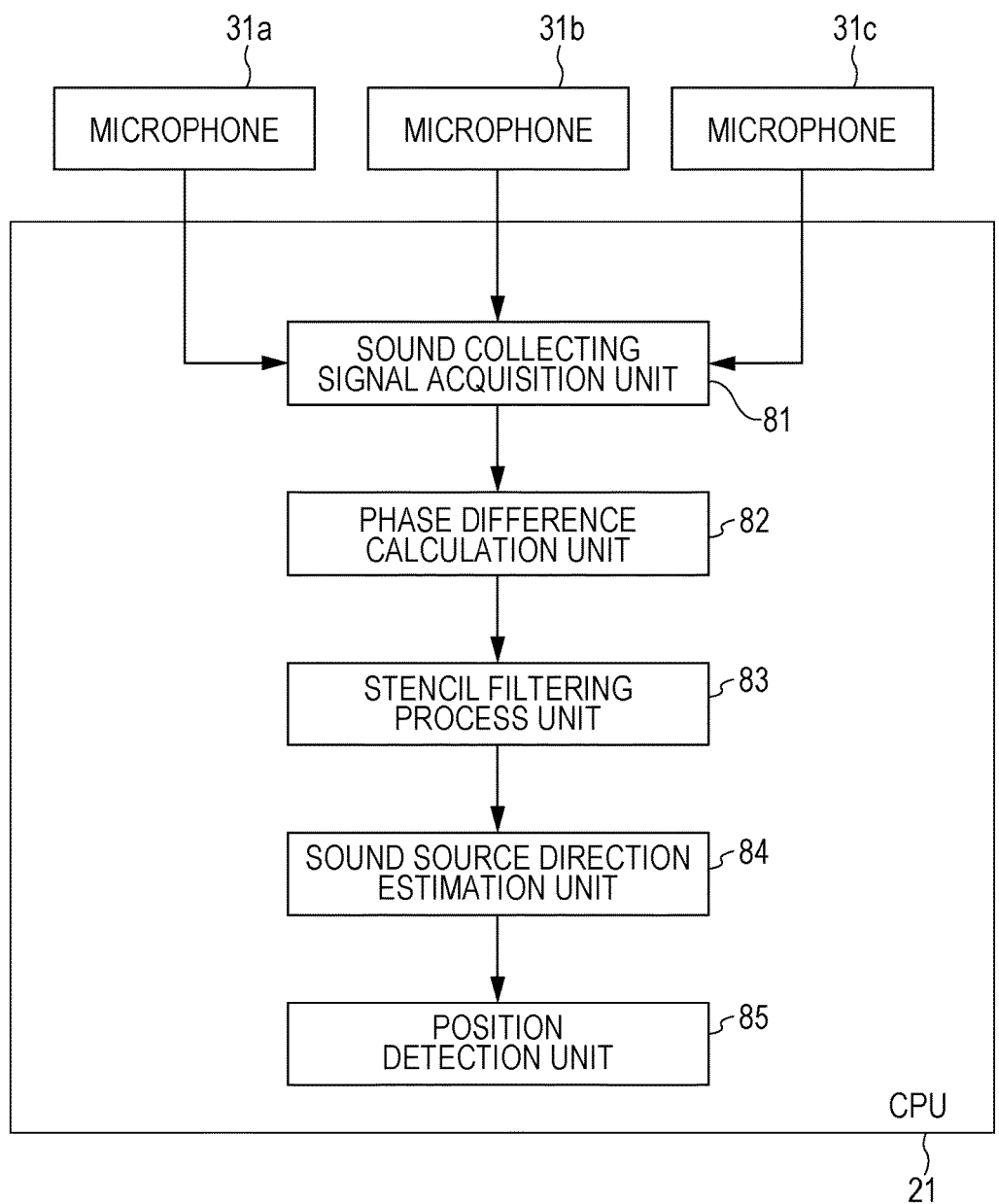
FIG. 10 is a block diagram illustrating a functional configuration of a CPU that performs a position detection process.

FIG. 10 is a block diagram illustrating a functional configuration of the CPU 21 that performs the position detection process. The CPU 21 acquires sound collecting signals from the microphones 31 disposed in the predetermined sound field space 13, and specifies the positions of a sound source and a virtual sound source. Three microphones 31 are provided in this embodiment, but can be provided in an arbitrary number n (n is a natural number equal to or higher than 3).

The CPU 21 in the present embodiment includes the sound collecting signal acquisition unit 81, the phase difference calculation unit 82, the stencil filtering process unit 83, the sound source direction estimation unit 84, and the position detection unit 85.

The sound collecting signal acquisition unit 81 has a function of acquiring a plurality of pairs of sound collecting signals in which sound collecting signals from two microphones 31 among the three microphones 31 are made to be one pair. For example, sound collecting signals of a pair of the first microphone 31a and the second microphone 31b, a pair of the second microphone 31b and the third microphone 31c, and a pair of the first microphone 31a and the third microphone 31c are acquired.

Note that, as will be described later, the accuracy of the microphones 31 improves as the number of the microphones increases, and it is preferable to constitute the microphones in a higher number than the dimension number of the space to be measured. Three microphones are appropriate for specifying the positions of the sound source and the virtual sound source in a two-dimensional space, and four microphones are appropriate for specifying the positions of the sound source and the virtual sound source in a three-dimensional space.

In addition, in specification of the positions of a sound source and a virtual sound source in the two-dimensional space, it is preferable that the three microphones 31 be disposed so as to be positioned on the vertexes of a right-angle triangle. Furthermore, in specification of the positions of a sound source and a virtual sound source in a three-dimensional space, it is preferable that four microphones 31 be disposed so as to be positioned on the vertexes of a cube indicating three-dimensional directions. With the configuration as described above, a sound source or a virtual sound source in an arbitrary direction in each dimensional space can be detected striking a balance, and calculation methods of respective directions can be configured to be the same, and thus, a burden of calculation can be reduced, and calculation accuracy can be stably enhanced.

Note that, when the positions of a sound source and a virtual sound source in a two-dimensional space are specified, if one of two positions obtained from calculation is selected by a user, the number of microphones 31 can be two.

The phase difference calculation unit 82 computes the phase difference of each frequency of the plurality of pairs of acquired sound collecting signals.

The stencil filtering process unit 83 has a function of accumulating phase differences periodically occurring for each frequency of the phase difference of the plurality of pairs of sound collecting signals.

The sound source direction estimation unit 84 has a function of estimating a plurality of pairs of sound source directions expressed by a linear equation of a line passing through a center point between the microphones 31 in each pair of microphones 31 from the information of the phase difference of each frequency of the sound collecting signals that has undergone the stencil filtering process. As will be described later, the linear equation expressed and estimated from the phase difference of each pair of sound collecting signals is a linear equation of a line passing through a sound source position estimated from the phase difference of each pair of sound collecting signals.

The position detection unit 85 has a function of specifying least-squares solutions of simultaneous equations that include the plurality of linear equations as the positions of a sound source and a virtual sound source. The specified positions of the sound source and the virtual sound source can be displayed on a display device (not shown) as two-dimensional or three-dimensional space coordinates if necessary.

Figure 11:
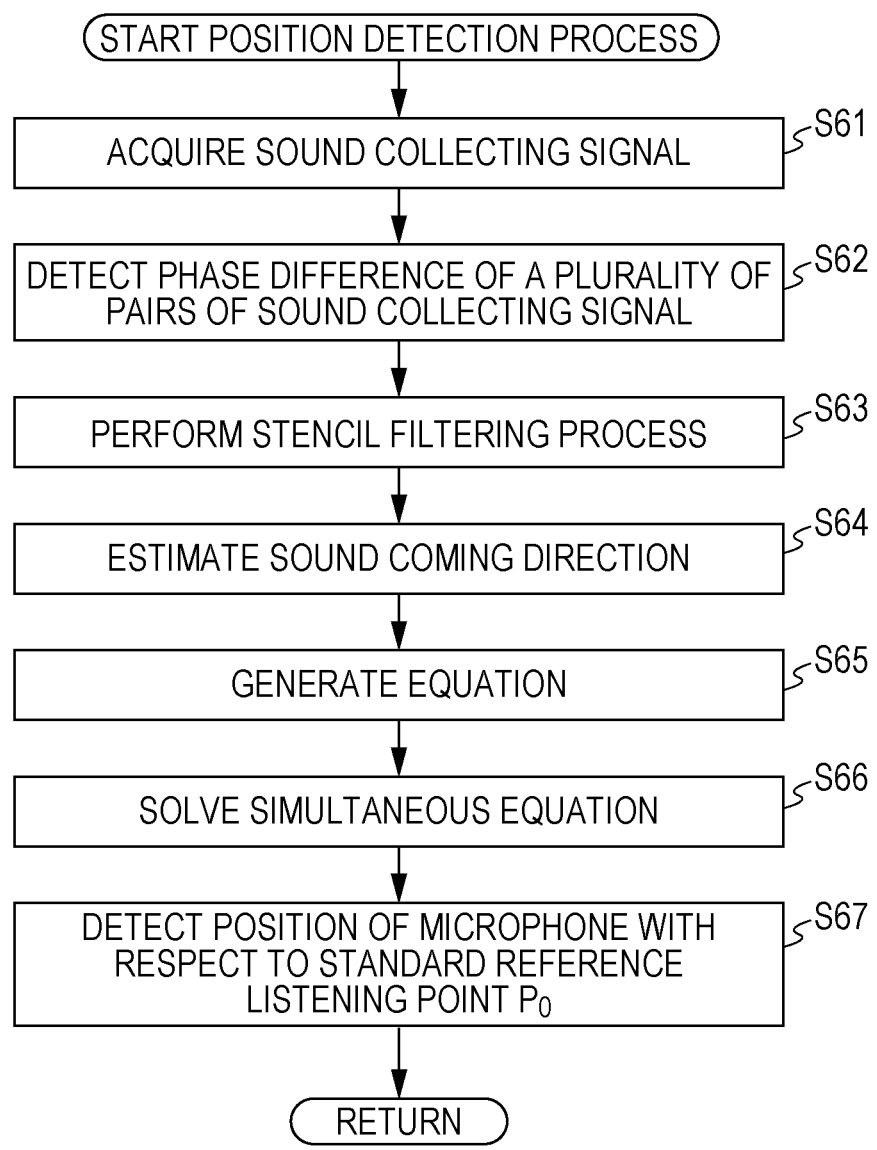
FIG. 11 is a flowchart describing the position detection process.

Next, details of the position detection process executed in Step S43 of FIG. 8 will be described with reference to FIG. 11. FIG. 11 is a flowchart describing the position detection process.

The sound collecting signal acquisition unit 81 of the CPU 21 acquires sound collecting signals in Step S61. In other words, the sound collecting signal acquisition unit 81 controls the DSP 22 to output a reference sound from one selected virtual speaker 121. The sound collecting signal acquisition unit 81 acquires the sound collecting signals collected by the three microphones 31. The plurality of pairs of acquired sound collecting signals are converted into digital signals, and stored in a memory, which is not shown.

The phase difference calculation unit 82 detects the phase difference of the plurality of pairs of sound collecting signals in Step S62. In other words, the phase difference calculation unit 82 reads the plurality of pairs of sound collecting signals stored in the memory, and computes the phase difference for each frequency.

The stencil filtering process unit 83 performs a stencil filtering process in Step S63. In other words, a stencil filtering process of accumulating phase difference patterns periodically appearing in each frequency of the sound collecting signals is performed.

The sound source direction estimation unit 84 estimates the direction from which a sound comes in Step S64. In other words, among phase-frequency patterns obtained by performing the stencil filtering process on all phase differences, patterns corresponding to frequency bands in which the position of a sound source is desired to be estimated are accumulated in a frequency direction, and then the direction from which the sound comes is estimated. The accumulation value becomes the maximum in the direction from which the sound comes. Thus, it is possible to estimate the direction from which the sound comes from the maximum accumulation value.

Figure 12:
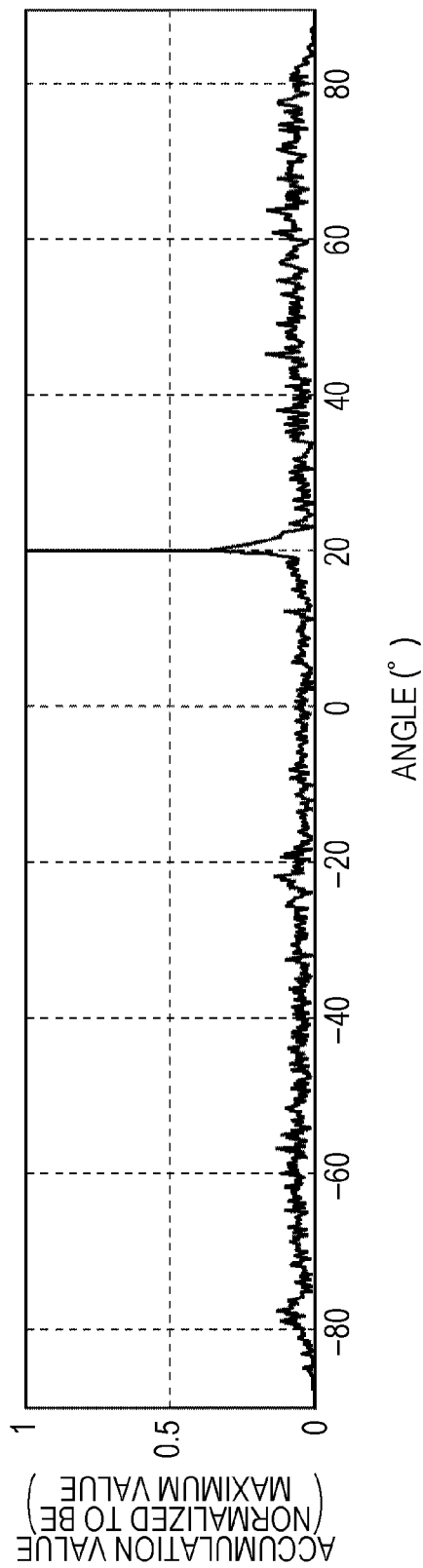
FIG. 12 is a diagram illustrating an example of a result of sound source direction estimation.

FIG. 12 is a diagram illustrating an example of a result of sound source direction estimation. In FIG. 12, the horizontal axis represents angles denoting the direction of a sound source, and the vertical axis represents accumulation values. In the example of FIG. 12, since the accumulation value is at the maximum in the direction of 20°, it is estimated that the virtual speaker 121 as a sound source is positioned in the direction of 20° with respect to the microphones 31.

The sound source direction estimation unit 84 executes a process of generating an equation in Step S65. In other words, the sound source direction estimation unit 84 solves an equation of a function expressing a linear equation of a line passing through the center point $P_m$ between the sound source and microphones 31 from an angle indicating the direction of the sound source.

Figure 13:
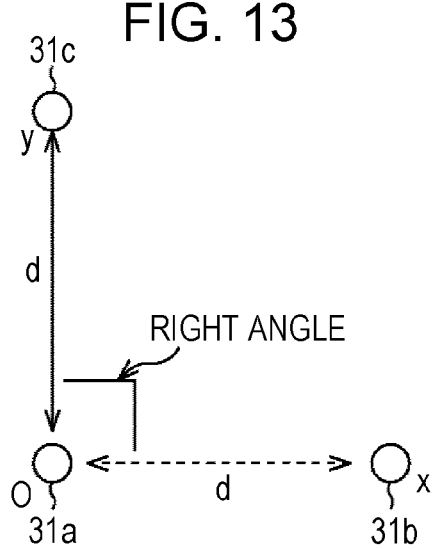
FIG. 13 is a diagram illustrating an example of disposition of microphones.

FIG. 13 is a diagram illustrating an example of disposition of the microphones 31. FIG. 13 illustrates an example when sound source position is estimated on a two-dimensional plane. In FIG. 13, with the first microphone 31a as the center axis O, the second microphone 31b is disposed on the x axis, and the third microphone 31c is disposed on the y axis. In addition, the distance between the first microphone 31a and the second microphone 31b and the distance between the first microphone 31a and the third microphone 31c are set to be d. In other words, the microphones 31 are disposed so as to be positioned on the vertexes of a right-angle isosceles triangle.

Figure 14:
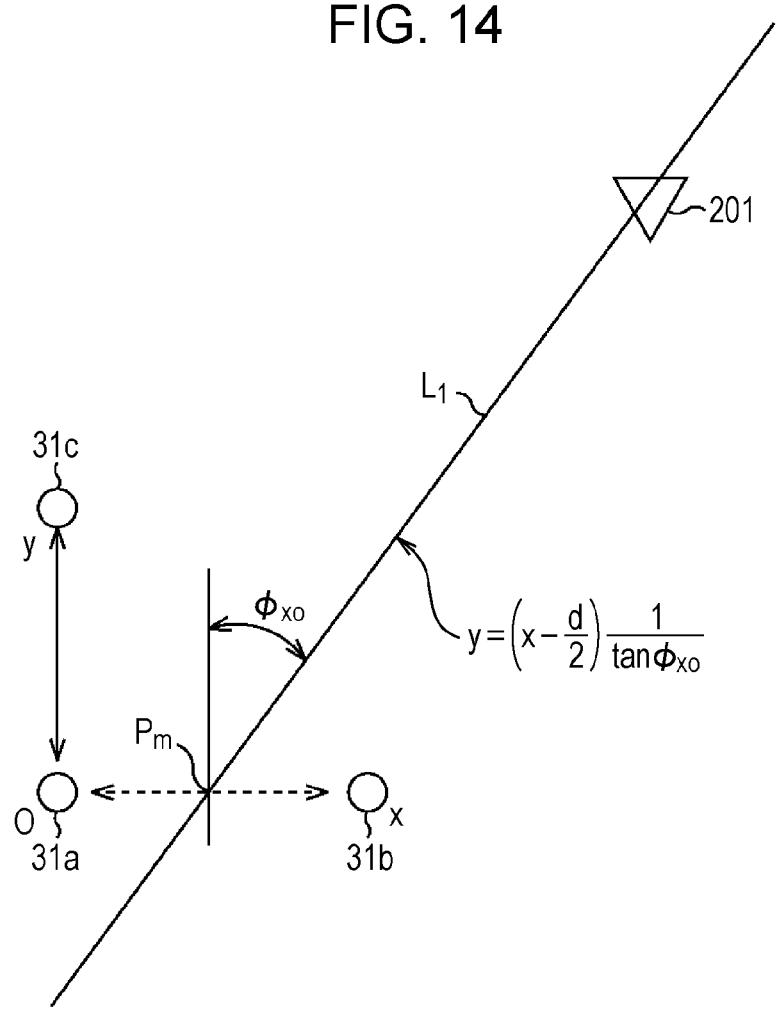
FIG. 14 is a diagram illustrating an example of a function of a linear equation of a line passing through a center point between a sound source and microphones.
Figure 15:
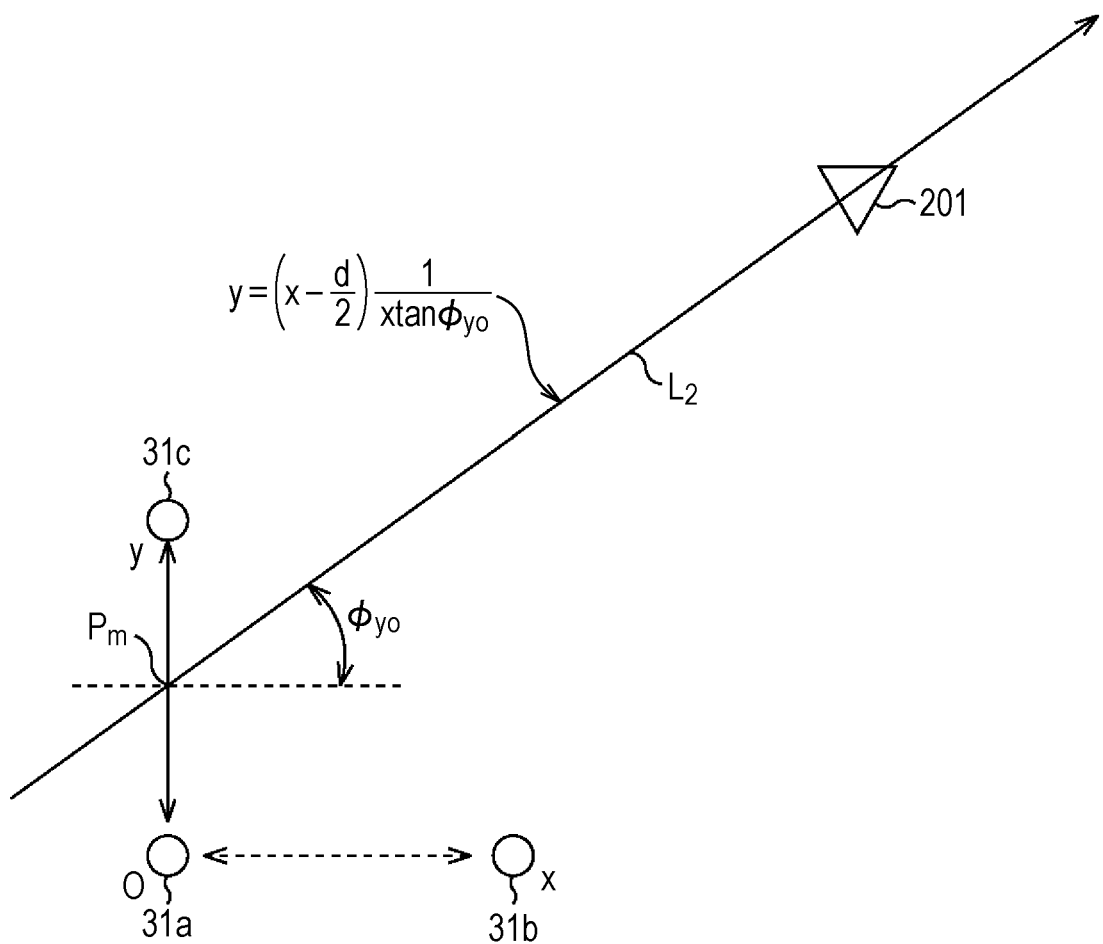
FIG. 15 is a diagram illustrating an example of a function of the linear equation of a line passing through the center point between the sound source and microphones.
Figure 16:
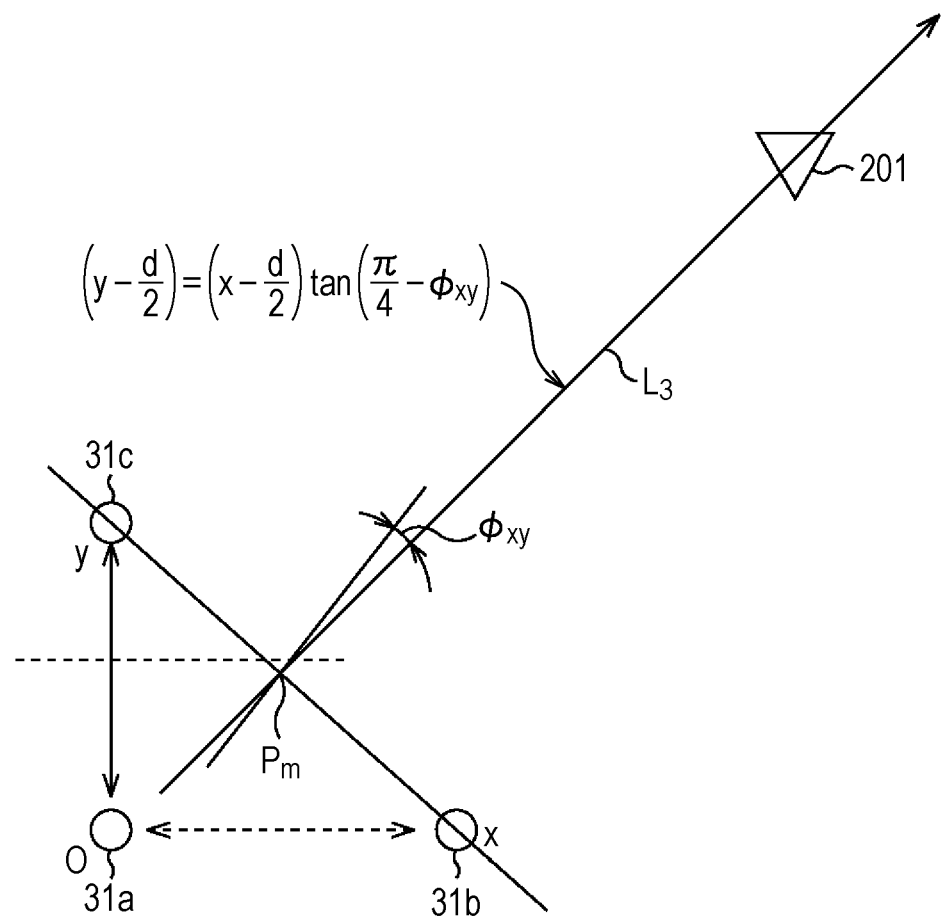
FIG. 16 is a diagram illustrating an example of a function of the linear equation of a line passing through the center point between the sound source and microphones.

Next, with reference to FIGS. 14 to 16, an example of a function of a linear equation of a line passing through the center point of an estimated sound source 201 and each microphone 31 is shown.

FIG. 14 is a diagram illustrating an example of a function of a linear equation of a line passing through the center point $P_m$ between the estimated sound source 201 and the first microphone 31a and the second microphone 31b. In FIG. 14, $\varphi_{xo}$ is an angle that is formed by the perpendicular line to the line connecting the first microphone 31a and the second microphone 31b on the two-dimensional plane and a line $L_1$ of the linear equation, and specified by the sound source direction estimation unit 84. The line $L_1$ in this case is expressed by the formula (4):

$$y = \left(x - \frac{d}{2}\right)\frac{1}{\tan\phi_{xo}} \quad (4)$$

FIG. 15 is a diagram illustrating an example of a function of the linear equation of a line passing through the center point $P_m$ between the estimated sound source 201 and the first microphone 31a and the third microphone 31c. In FIG. 15, $\varphi_{yo}$ is an angle that is formed by the perpendicular line to the line connecting the first microphone 31a and the third microphone 31c on the two-dimensional plane and a line $L_2$ of the linear equation, and specified by the sound source direction estimation unit 84. The line $L_2$ in this case is expressed by the formula (5):

$$y = \left(x - \frac{d}{2}\right)\frac{1}{\tan\phi_{yo}} \quad (5)$$

FIG. 16 is a diagram illustrating an example of a function of the linear equation of a line passing through the center point $P_m$ between the estimated sound source 201 and the second microphone 31b and the third microphone 31c. In FIG. 16, $\varphi_{xy}$ is an angle that is formed by the perpendicular line to the line connecting the second microphone 31b and the third microphone 31c on the two-dimensional plane and a line $L_3$ of the linear equation, and specified by the sound source direction estimation unit 84. The line $L_3$ in this case is expressed by the formula (6):

$$\left(y - \frac{d}{2}\right) = \left(x - \frac{d}{2}\right)\tan\left(\frac{\pi}{4} - \phi_{xy}\right) \quad (6)$$

When more number of microphones 31 are used, it is preferable to perform the processes of Steps S61 to S65 on all pairs of microphones. In the same manner, by defining the center points between the microphones 31 included in specific pairs, and the angle that is formed by the perpendicular lines to the line connecting the microphones 31 included in the specific pairs on a two-dimensional plane and a line of the linear equation in a three-dimensional space, the respective elements are computed.

Next, the position detection unit 85 executes a process of solving the simultaneous equations in Step S66. When there is no solution to the simultaneous equations, a least-squares error solution is obtained. Then, the position detection unit 85 detects the positions of the microphones 31 with respect to the standard reference listening point $P_0$ in Step S67. In other words, by solving the simultaneous equations, a vector $V_{12}$ (refer to FIG. 9) as position information indicating the position of the virtual speaker 121 as the sound source 201 with respect to the microphones 31 is obtained.

The position of the virtual speaker 121 is also included on the sound field correction data map stored in the non-volatile memory 28. As illustrated in FIG. 9, the position of the virtual speaker 121 stored on the sound field correction data map is a vector $V_{11}$ as position information indicating the position with respect to the standard reference listening point $P_0$. Thus, the position difference data $V_1$ that is a vector indicating the position of a microphone 31 with respect to the standard reference listening point $P_0$ is obtained from the vector $V_{11}$ and the vector $V_{12}$. As described above, vector $V_{11}$ is a vector indicating the position of the virtual speaker 121 with respect to the standard reference listening point $P_0$, and the vector $V_{12}$ is a vector obtained by solving the simultaneous equations, indicating the position of the virtual speaker 121 with respect to the microphone 31.

Figure 17:
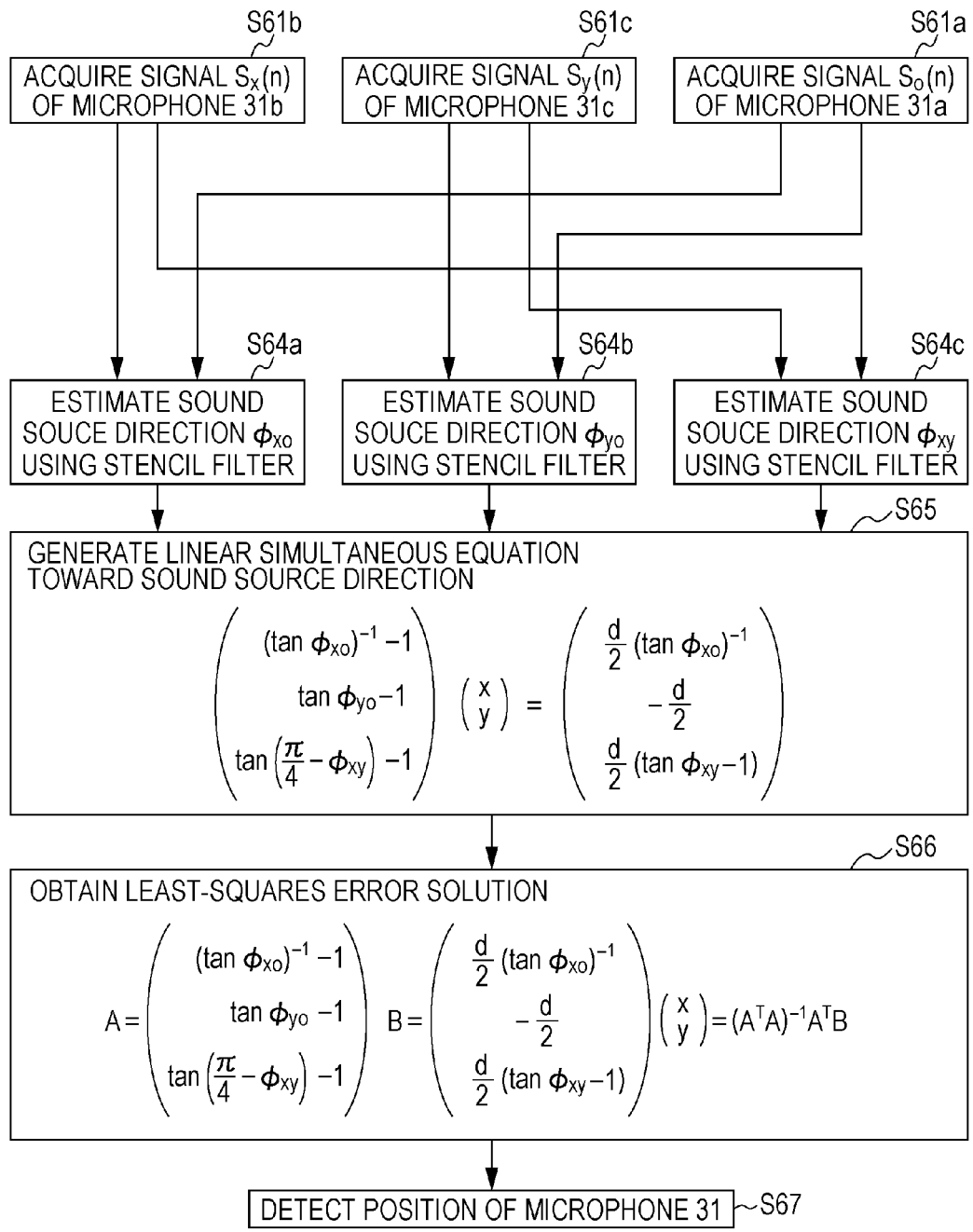
FIG. 17 is a flowchart showing a position detection process on a two-dimensional plane.

Next, with reference to FIG. 17, a specific example of the position detection process on the two-dimensional plane will be further described. FIG. 17 is a flowchart showing the position detection process on the two-dimensional plane. First, signals $S_x(n)$, $S_y(n)$, and $S_o(n)$ of n (in the case of the drawing, n=3) microphones 31a, 31b, and 31c shown in FIGS. 14 to 16 are acquired (Steps S61b, S61c, and S61a). Sound source directions $\varphi_{xo}$, $\varphi_{yo}$, and $\varphi_{xy}$ are estimated from the pairs of signals using stencil filtering (Steps S64a, S64b, and S64c). To be specific, the sound source direction $\varphi_{xo}$ is estimated using the signals $S_x(n)$, and $S_o(n)$, the sound source direction $\varphi_{yo}$ is estimated using the signals $S_y(n)$ and $S_o(n)$, and the sound source direction $\varphi_{xy}$ is estimated using the signals $S_x(n)$ and $S_y(n)$.

The following simultaneous equations including linear equations of lines indicating the sound source directions are generated (Step S65).

$$\begin{pmatrix} (\tan\phi_{xo})^{-1} - 1 \\ \tan\phi_{yo} - 1 \\ \tan\left(\frac{\pi}{4} - \phi_{xy}\right) - 1 \end{pmatrix}\begin{pmatrix} x \\ y \end{pmatrix} = \begin{pmatrix} \frac{d}{2}(\tan\phi_{xo})^{-1} \\ -\frac{d}{2} \\ \frac{d}{2}(\tan\phi_{xy} - 1) \end{pmatrix} \quad (7)$$

The least-squares error solutions to the generated simultaneous equations are obtained (Step S66).

$$A = \begin{pmatrix} (\tan\phi_{xo})^{-1} - 1 \\ \tan\phi_{yo} - 1 \\ \tan\left(\frac{\pi}{4} - \phi_{xy}\right) - 1 \end{pmatrix} \quad (8)$$

$$B = \begin{pmatrix} \frac{d}{2}(\tan\phi_{xo})^{-1} \\ -\frac{d}{2} \\ \frac{d}{2}(\tan\phi_{xy} - 1) \end{pmatrix} \quad (9)$$

$$\begin{pmatrix} x \\ y \end{pmatrix} = (A^T A)^{-1} A^T B \quad (10)$$

From the solutions, the sound source coordinates (x, y) which are coordinates of the virtual speaker 121 are estimated, and further, the position of the microphones 31 are detected from the sound source coordinates (x, y) (Step S67).

In the above description, the position detection process is executed by the CPU 21, but can be executed by the DSP 22.

Modification Example

In Step S32 of FIG. 5, the average value of the parameters for frequency characteristic correction of left channels and right channels is set to be computed, however, the following process can still be executed. In other words, any one of the parameters for frequency characteristic correction of the right channels and the left channels can be selected based on the size of the amount of frequency correction of right channels and the left channels.

To be specific, an additional value of the absolute values of the gains G of the left channels of $G_{LS}=|G_{L1}|+|G_{L2}|+|G_{L3}|+\ldots$ and an additional value of the absolute values of the gains G of the right channels of $G_{RS}=|G_{R1}|+|G_{R2}|+|G_{R3}|+\ldots$ are computed. Then the additional values of $G_{LS}$ and $G_{RS}$ are compared, and among the additional values, a parameter for frequency correction of a smaller value or a greater value than the other, in other words, any one of the right channels and the left channels is set in the equalizer devices 62$_1$ and 62$_2$.

In addition, instead of computing the average value of the parameters for frequency correction of the right channels and the left channels, any one of the parameters for frequency correction of the right channels and the left channels can also be selected based on the size of the amount of the frequency correction in a predetermined frequency band.

To be specific, the sizes of a gain $G_L$ of a left channel and a gain $G_R$ of a right channel in a predetermined frequency band $\Delta f$ are determined. Then, among the gains a parameter for frequency correction of a smaller gain or a greater gain than the other, in other words, any one of the right channel and the left channel is set in the equalizer devices 62$_1$ and 62$_2$.

Furthermore, instead of computing the average value of the parameters for frequency correction of the right channels and the left channels, the sizes of the frequency correction amount are determined for predetermined frequency bands, and a parameter for frequency correction of a greater amount or a smaller amount of the correction than the other in a frequency band can also be selected.

To be specific, the sizes of a gain $G_L$ of a left channel and a gain $G_R$ of a right channel in each frequency band $\Delta f$ are determined, and then among the gains, a parameter for frequency correction of a smaller gain or a greater gain than the other is set in the equalizer devices 62$_1$ and 62$_2$.

Furthermore, instead of computing the average value of the parameters for frequency correction of the right channels and the left channels, the following process can also be executed. In other words, the difference between the amount of frequency correction of the right channels and the amount of frequency correction of the left channels are computed. Then, when the difference of the amounts of correction is equal to or higher than a predetermined value, a correction process of a frequency characteristic is performed on sound signals of the right channels and the left channels. When the difference of the amounts of correction is less than the predetermined value, the correction process of the frequency characteristic is not performed on the sound signals of the right channels and the left channels.

To be specific, an additional value of the absolute values of the gains G of the left channels of $G_{LS}=|G_{L1}|+|G_{L2}|+|G_{L3}|+\ldots$ and an additional value of the absolute values of the gains G of the right channels of $G_{RS}=|G_{R1}|+|G_{R2}|+|G_{R3}|+\ldots$ are computed. Then, the difference between the additional value $G_{LS}$ and the additional value $G_{RS}$ $|G_{LS}-G_{RS}|$ is computed, and then it is determined whether or not the difference $|G_{LS}-G_{RS}|$ is equal to or greater than the predetermined value $\Delta G$. When the difference $|G_{LS}-G_{RS}|$ is equal to or greater than $\Delta G$, the average value or any one of the parameters for frequency correction of the right channels and the left channels is set in the equalizer devices 62$_1$ and 62$_2$. When difference $|G_{LS}-G_{RS}|$ is less than $\Delta G$, the correction process of the frequency characteristic is not performed on the sound signals of the right channels and left channels.

In addition, the following operation can also be performed. In other words, the difference between the gain $G_L$ of the left channel and the gain $G_R$ of the right channel, which is $|G_L-G_R|$ in a predetermined frequency band $\Delta f$ is computed. It is determined whether or not the difference $|G_L-G_R|$ is equal to or greater than a predetermined value $\Delta G$. When the difference $|G_L-G_R|$ is equal to or greater than $\Delta G$, the average value or any one of the parameters for frequency correction of the right channels and the left channels is set in the equalizer devices 62$_1$ and 62$_2$. On the other hand, when the difference $|G_L-G_R|$ is less than $\Delta G$, the correction process of the frequency characteristic is not performed on the sound signals of the right channels and left channels.

Furthermore, the following operation can also be performed. In other words, the difference between the gain $G_L$ of the left channel and the gain $G_R$ of the right channel, which is $|G_L-G_R|$ in each frequency band $\Delta f$ is computed, and then it is determined whether or not the difference $|G_L-G_R|$ is equal to or greater than the predetermined value $\Delta G$. When the difference $|G_L-G_R|$ is equal to or greater than $\Delta G$, the average value or any one of the parameters for frequency correction of the right channels and the left channels is set in the equalizer devices 62$_1$ and 62$_2$. When the difference $|G_L-G_R|$ is less than $\Delta G$, the correction process of the frequency characteristic is not performed on the sound signals of the right channels and left channels.

The above-described values are merely examples, and different values may also be used if necessary. In addition, each of configurations described above can be combined with each other as long as it does not depart from the gist of the present technology.

Furthermore, in the above-described embodiment, the case in which the correction process of a frequency characteristic is performed on sound signals of the front-left channel and the front-right channel has been described, but the following configuration can also be employed. In other words, the correction process of frequency characteristics may also be performed on sound signals of the surround-left channel, the surround-right channel, the surround-back left channel, the surround-back right channel, and the like.

Note that, sound signals on which the correction process of the frequency characteristics is performed are arbitrary. It is preferable to set the signals to be sound signals of channels output from a side or the back side of a user, such as the surround-left channel, the surround-right channel, the surround-back left channel, the surround-back right channel, and the like. This is because little shift in phases of the sound signals of the surround-left channel, the surround-right channel, the surround-back left channel, the surround-back right channel, and the like is preferable in order to obtain an appropriate surround effect.

Figure 18:
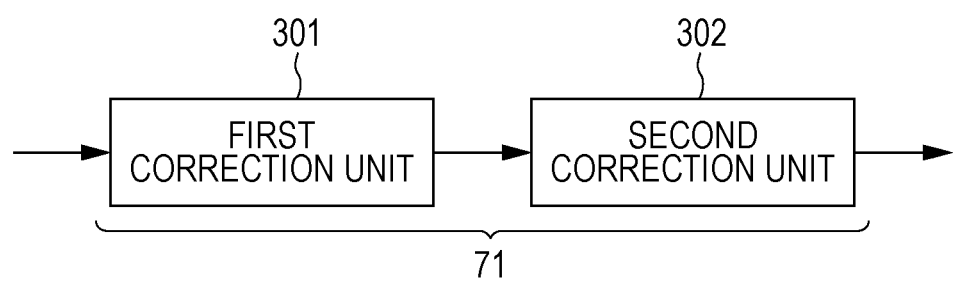
FIG. 18 is a block diagram illustrating another configuration example of a correction unit.

In addition, in the embodiment of FIG. 3, one correction unit 71 is provided, but as shown in FIG. 18, two correction units can also be provided. FIG. 18 is a block diagram showing another configuration example of the correction unit 71. In the embodiment of FIG. 18, the correction unit 71 includes a first correction unit 301 and a second correction unit 302 that is subordinately connected to the first correction unit so that each can individually set parameters.

The first correction unit 301 and the second correction unit 302 have the same configuration. In other words, the first correction unit 301 includes the sound field processing device 61, the equalizer device 62, and the delay device 63 as the correction unit 71 of FIG. 3. The second correction unit 302 also includes the sound field processing device 61, the equalizer device 62, and the delay device 63 as the correction unit 71 of FIG. 3.

In the first correction unit 301, the parameter $PR_0$ of the formula (3) is set as the first sound field correction data stored in the non-volatile memory 28 in Step S41 of FIG. 8. In the second correction unit 302, the sound field correction data $D'_j$ that is the second sound field correction data on the sound field correction data map 101 stored in the non-volatile memory 28 in advance is set. As a result, a sound field correction process using the parameter $PR_0$ is performed by the first correction unit 301, a sound field correction process using the sound field correction data $D'_j$ is performed by the second correction unit 302, and accordingly, a sound field correction process using the parameter $PR_j$ of the formula (3) is collectively performed. When the listening point $P_k$ is positioned on the standard reference listening point $P_0$, sound field correction data $D'_0$ becomes 0. Thus, the second correction unit 302 does not substantially perform a special process, and just outputs sound signals input from the first correction unit 301 to the later stage without change. Also in the embodiment, the same effect as in the embodiment of FIG. 3 can be realized.

Application of the present technology to a program

A series of processes described above can be executed by hardware, or by software.

When the series of processes is executed by software, a program constituting the software is installed in a computer into which a dedicated hardware is incorporated or, for example, a general-purpose personal computer that can execute various functions from a network or a recording medium by installing various programs.

Such a recording medium in which the program is stored is configured as a removable medium 29 such as a magnetic disk (including a floppy disk), an optical disc (including a compact disk-read only memory (CD-ROM) or a DVD), a magneto-optical disc (including a mini-disc (MD)), or a semiconductor memory on which programs are recorded and is distributed to provide users with the programs separate from the main body of a device, and configured as a flash ROM or a hard disk included in a storage unit on which programs are recorded to provide users with them in a state of being incorporated into the main body of a device in advance.

Note that, in the present specification, steps of describing a program recorded in a recording medium include not only processes performed in time series in an order but also processes executed in parallel or an individual manner, not necessarily executed in a time series manner.

In addition, in the present specification, a system means a set of a plurality of constituent elements (devices, modules (components), and the like), and it does not matter whether or not all constituent elements are accommodated in the same housing. Thus, a plurality of devices which are accommodated in separate housings and connected with each other via a network, and one device of which one housing accommodates a plurality of modules are all systems.

Note that, embodiments of the present technology are not limited to the above, and can be variously modified within the scope not departing from the gist of the present technology.

Other Configurations

The present technology can also employ the following configurations:

(1) A sound processing device which includes a shift detection unit that detects a shift of a listening point on which a user listens to a sound in a sound field space from a standard reference listening point, and a correction unit that corrects a sound signal based on first sound field correction data for correcting a sound field when the listening point is the standard reference listening point and second sound field correction data for correcting a sound field of the listening point when the listening point is shifted from the standard reference listening point.

(2) The sound processing device described in (1) above, in which the second sound field correction data is data of a peripheral reference listening point in a position shifted from the standard reference listening point.

(3) The sound processing device described in (2) above, in which, when the position of the listening point is different from the position of the peripheral reference listening point, the second sound field correction data on the nearest peripheral reference listening point is the second sound field correction data of the listening point.

(4) The sound processing device described in any one of (1) to (3) above, in which the shift of the listening point from the standard reference listening point is detected by collecting a measurement sound generated from the listening point.

(5) The sound processing device described in (4) above, in which the shift of the listening point from the standard reference listening point is detected from the position of the listening point with respect to a position in which the measurement sound generated from the listening point is collected and a position in which the measurement sound is collected with respect to the standard reference listening point.

(6) The sound processing device described in (5) above, in which the position of the listening point with respect to the position in which the measurement sound generated from the listening point is collected is detected from a sound signal obtained by collecting the measurement sound generated from the listening point.

(7) The sound processing device described in (5) or (6) above, in which the position in which the measurement sound is collected with respect to the standard reference listening point is detected from position information of a sound emitting unit that emits a sound that the user listens to on the listening point in the sound field space with respect to the position in which the measurement sound is collected and position information of the sound emitting unit with respect to the standard reference listening point.

(8) The sound processing device described in any one of (1) to (7) above, which further includes a measurement unit that obtains the first sound field correction data by measuring a sound field of the sound field space.

(9) The sound processing device described in any one of (1) to (8) above, which further includes a storage unit that stores the second sound field correction data in advance.

(10) The sound processing device described in (9) above, in which the storage unit further stores the first sound field correction data measured by the measurement unit.

(11) The sound processing device described in any one of (1) to (10) above, in which a parameter calculated from the first sound field correction data and the second sound field correction data is set in the correction unit.

(12) The sound processing device described in any one of (1) to (10) above, in which the first sound field correction data and the second sound field correction data are set as individual parameters in different correction units.

(13) A sound processing method which includes steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

(14) A program that causes a computer to execute processes including steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

(15) A recording medium on which is recorded a program that causes a computer to execute processes including steps of detecting a shift of a listening point on which a user listens to a sound in a sound field space from a standard reference listening point, and correcting a sound signal based on first sound field correction data for correcting a sound field when the listening point is the standard reference listening point and second sound field correction data for correcting a sound field of the listening point when the listening point is shifted from the standard reference listening point.

The present disclosure contains subject matter related to that disclosed in Japanese Priority Patent Application JP 2012-219978 filed in the Japan Patent Office on Oct. 2, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound processing device, comprising:
    a shift detection unit configured to detect a shift of a listening point, at which a user listens to a sound in a sound field space, from a standard reference listening point;
    a position detection unit configured to detect a first position of a microphone with respect to the standard reference listening point; and
    a correction unit configured to correct a first sound signal at the listening point shifted from the standard reference listening point based on a sum of first sound field correction data, second sound field correction data, and the detected first position of the microphone,
    wherein the first sound field correction data enables correction of a first sound field at the standard reference listening point, and
    wherein the second sound field correction data enables correction of a second sound field at the listening point shifted from the standard reference listening point.

2. The sound processing device according to claim 1, wherein the second sound field correction data includes a peripheral reference listening point in a second position shifted from the standard reference listening point.

3. The sound processing device according to claim 2, wherein, based on a third position of the listening point that is different from the second position of the peripheral reference listening point, a third sound field correction data on a nearest peripheral reference listening point is the second sound field correction data of the listening point.

4. The sound processing device according to claim 3, wherein the shift of the listening point from the standard reference listening point is detected based on collection of a measurement sound generated from the listening point.

5. The sound processing device according to claim 4, wherein the shift of the listening point from the standard reference listening point is detected from the third position of the listening point with respect to a fourth position in which the measurement sound generated from the listening point is collected and a fifth position in which the measurement sound is collected with respect to the standard reference listening point.

6. The sound processing device according to claim 5, wherein the third position of the listening point, with respect to the fourth position in which the measurement sound generated from the listening point is collected, is detected from a second sound signal obtained based on the collection of the measurement sound generated from the listening point.

7. The sound processing device according to claim 6, wherein the fifth position, in which the measurement sound is collected with respect to the standard reference listening point, is detected from position information of a sound emitting unit that emits a sound that the user listens to on the listening point in the sound field space with respect to the fourth position in which the measurement sound is collected and the position information of the sound emitting unit with respect to the standard reference listening point.

8. The sound processing device according to claim 7, further comprising:
    a measurement unit configured to obtain the first sound field correction data based on measurement of a sound field of the sound field space.

9. The sound processing device according to claim 8, further comprising:
    a storage unit configured to store the second sound field correction data.

10. The sound processing device according to claim 9, wherein the storage unit is further configured to store the first sound field correction data measured by the measurement unit.

11. The sound processing device according to claim 10, wherein a parameter calculated from the sum of the first sound field correction data and the second sound field correction data is set in the correction unit.

12. The sound processing device according to claim 10, wherein the first sound field correction data and the second sound field correction data are set as individual parameters in different correction units.

13. The sound processing device according to claim 1, wherein the position detection unit is further configured to:
    specify least-squares solutions of simultaneous equations that include a plurality of linear equations as first positions of a sound source and a virtual sound source, and
    detect the first position of the microphone with respect to the standard reference listening point based on a solution of the simultaneous equations.

14. A sound processing method, comprising:
    detecting a shift of a listening point, at which a user listens to a sound in a sound field space, from a standard reference listening point;
    detecting a position of a microphone with respect to the standard reference listening point; and
    correcting a sound signal at the listening point shifted from the standard reference listening point based on a sum of first sound field correction data, second sound field correction data, and the detected position of the microphone,
    wherein the first sound field correction data enables correction of a first sound field at the standard reference listening point, and
    wherein the second sound field correction data enables correction of a second sound field at the listening point shifted from the standard reference listening point.

15. A non-transitory computer-readable medium having stored thereon, computer-executable instructions that, when executed by a processor, cause the processor to execute operations, the operations comprising:
    detecting a shift of a listening point, at which a user listens to a sound in a sound field space, from a standard reference listening point;
    detecting a position of a microphone with respect to the standard reference listening point; and
    correcting a sound signal at the listening point shifted from the standard reference listening point based on a sum of first sound field correction data, second sound field correction data, and the detected position of the microphone,
    wherein the first sound field correction data enables correction of a first sound field at the standard reference listening point, and
    wherein the second sound field correction data enables correction of a second sound field at the listening point shifted from the standard reference listening point.

* * * * *